US006985086B2

(12) United States Patent
Tang et al.

(10) Patent No.: US 6,985,086 B2
(45) Date of Patent: Jan. 10, 2006

(54) METHOD AND APPARATUS FOR LWD SHEAR VELOCITY MEASUREMENT

(75) Inventors: Xiao Ming Tang, Sugar Land, TX (US); Douglas J. Patterson, Houston, TX (US); Tsili Wang, Katy, TX (US); James V. Leggett, III, Houston, TX (US); Vladimir Dubinksy, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/958,221

(22) Filed: Oct. 4, 2004

(65) Prior Publication Data

US 2005/0078555 A1    Apr. 14, 2005

Related U.S. Application Data

(62) Division of application No. 10/045,263, filed on Nov. 7, 2001, now Pat. No. 6,850,168.

(60) Provisional application No. 60/248,097, filed on Nov. 13, 2000.

(51) Int. Cl.
G01V 3/00 (2006.01)

(52) U.S. Cl. .................. 340/854.4; 702/6; 367/25; 367/75; 181/105; 181/122; 181/106

(58) Field of Classification Search ............ 340/853.1, 340/854.4, 854.5; 367/25, 75; 181/105, 181/106, 113, 122; 324/337, 333, 338; 702/6
See application file for complete search history.

(56) References Cited

U.S. PATENT DOCUMENTS

| | | | |
|---|---|---|---|
| 4,685,091 A | 8/1987 | Chung et al. .................. 367/31 |
| 4,932,003 A | 6/1990 | Winbow et al. .............. 367/75 |
| 4,951,267 A | 8/1990 | Chang et al. .................. 367/31 |
| 5,027,331 A | 6/1991 | Winbow et al. .............. 367/75 |
| 5,077,697 A | 12/1991 | Chang .......................... 367/31 |
| 5,278,805 A | 1/1994 | Kimball ........................ 367/32 |
| 5,510,582 A | 4/1996 | Birchak et al. ............. 181/102 |
| 5,796,677 A | 8/1998 | Kostek et al. ................ 367/25 |
| 5,831,934 A | 11/1998 | Gill et al. ..................... 367/25 |
| 5,852,262 A | 12/1998 | Gill et al. ................... 181/106 |

(Continued)

FOREIGN PATENT DOCUMENTS

EP    0778473    6/1997

OTHER PUBLICATIONS

S. T. Chen; *Shear-wave logging with quadrupole sources*, Geophysics, vol. 54, No. 5, (May 1989), pp. 590-594, 14 Figures.

Andrew L. Kurkjian et al.; *Acoustic multipole sources in fluid-filled boreholes*, Geophysics, vol. 51, No. 1, (Jan. 1986), p. 148 163, 24 Figures, 3 Tables.

(Continued)

*Primary Examiner*—Albert K. Wong
(74) *Attorney, Agent, or Firm*—Madan, Mossman & Sriram, P.C.

(57) ABSTRACT

The logging tool of this invention includes a transmitter conveyed on a drilling collar for exciting a quadrupole signal in a borehole being drilled by a drill bit and a receiver for receiving the signal. The transmitter is operated at a frequency below the cut-off frequency of the quadrupole collar mode. The received signal consists primarily of the formation quadrupole mode which, at low frequencies, has a velocity that approaches the formation shear velocity. The transmitter, in one embodiment, consists of eight equal sectors of a piezoelectric cylinder mounted on the rim of the drilling collar. The value of the cut-off frequency is primarily dependent on the thickness of the drilling collar. Alternatively, the transmitter may be operated to produce both the collar mode and the formation mode and a processor may be used to filter out the collar mode.

19 Claims, 16 Drawing Sheets

U.S. PATENT DOCUMENTS

| | | | |
|---|---|---|---|
| 5,852,587 A | 12/1998 | Kostek et al. | 367/25 |
| 5,936,913 A | 8/1999 | Gill et al. | 367/25 |
| 5,971,095 A | 10/1999 | Ozbek | 181/112 |
| 6,082,484 A | 7/2000 | Molz et al. | 181/102 |
| 6,084,826 A | 7/2000 | Leggett, III | 367/82 |
| 6,366,531 B1 | 4/2002 | Varsamis et al. | 367/36 |
| 6,552,962 B1 | 4/2003 | Varsamis et al. | 367/25 |
| 6,631,327 B2 | 10/2003 | Hsu et al. | 702/6 |
| 6,850,168 B2 * | 2/2005 | Tang et al. | 340/854.4 |

OTHER PUBLICATIONS

Chaur-Jain Hsu et al.; *Mandrel effects on the dipole flexural mode in a borehole*, J. Acoust. Soc. Am. 104 (4), Oct. 1998, pp. 2025-2039, 11 Figs.

V. N. Rama Rao et al.; *Acoustics of fluid-filled boreholes with pipe: Guided propagation and radiation*, J. Acoust. Soc. Am. 105 (6), Jun. 1999, pp. 3057-3068, 15 Figs.

* cited by examiner

METHOD AND APPARATUS FOR LWD SHEAR VELOCITY MEASUREMENT

CROSS REFERENCES TO RELATED APPLICATIONS

This application is a divisional of U.S. patent application Ser. No. 10/045,263 filed on Nov. 7, 2001 now U.S. Pat No. 6,850,168, with a priority claim to U.S. Provisional Patent Application Ser. No. 60/248,097 filed on Nov. 13, 2000. This application is also related to U.S. patent application Ser. No. 09/590,906 now U.S. Pat. No. 6,614,360, having the same assignee as the present application and the contents of which are fully incorporated herein by reference.

FIELD OF THE INVENTION

This invention generally relates to a method and apparatus for measuring and processing a characteristic of subsurface earth formations penetrated by a borehole. More specifically this invention relates to a method and apparatus for measuring and processing an acoustic characteristic such as formation shear wave velocity of subsurface sonic waves after these waves traverse earth formations adjoining a borehole or passing through a portion of the subsurface.

BACKGROUND OF THE INVENTION

To obtain hydrocarbons such as oil and gas, wellbores (also referred to as the boreholes) are drilled by rotating a drill bit attached at the end of a drilling assembly generally referred to as the "bottom hole assembly" (BHA) or the "drilling assembly." The wellbore path of such wells is carefully planned prior to drilling such wellbores utilizing seismic maps of the earth's subsurface and well data from previously drilled wellbores in the associated oil fields. Due to the very high cost of drilling such wellbores and the need to minimize time actually spent drilling and wireline logging wells, it is essential to gain as much information as possible during drilling of the wellbores. Information about downhole conditions and materials may be acquired with wireline tools or bottom hole assemblies (BHA). Wireline tools are generally used after a wellbore is drilled, bottom hole assemblies may be used while the well is being drilled as part of the drilling string. Downhole wellbore information acquired from BHA components may be utilized, among other things, to monitor and adjust the drilling direction of the wellbores or to detect the presence of geologic formations and hydrocarbons.

In logging while drilling through an earth formation, it is desirable to measure formation shear wave velocity. The shear wave velocity of earth formations provides information important for exploration and production of oil and gas from the formation. The shear wave velocity profile enables the conversion of seismic shear wave time sections to depth sections and is utilized in the interpretation of seismic wave amplitude variation versus detector offset. The ratio between the shear wave velocity and the compressional wave velocity is closely related to the rock lithology and is related to hydrocarbon saturation. Shear wave velocity is also used to evaluate the mechanical properties of the formation in reservoir engineering applications.

Because of the importance of earth formation shear velocity, various methods have been developed to measure it. In conventional wireline logging using a monopole acoustic tool, the shear velocity can be measured from the shear wave refracted along the borehole wall if the formation shear wave velocity is greater than the borehole fluid acoustic velocity. A formation that has a shear wave velocity faster than the borehole fluid is called a 'fast formation.' However, in a formation where the shear velocity is slower than borehole fluid velocity, a 'slow formation,' the shear wave can no longer refract along the borehole wall, and the shear velocity cannot be directly measured from monopole logging. Because of the need to measure shear velocity in slow formations, especially in the soft sediments of deep-water reservoirs, dipole acoustic logging tools were developed. The dipole tool induces and measures the bending or flexural wave motion in the formation. In a sufficiently low frequency range (1–3 kHz), the flexural wave travels at the shear velocity of the formation, regardless whether the formation is fast or slow. This allows for direct measurement of formation shear velocity using the dipole acoustic tool. Dipole acoustic logging is now a mature technology with worldwide commercial applications.

A viable technique for shear wave velocity measurement is using the quadrupole shear waves. A quadrupole acoustic tool induces and measures the quadrupole shear wave in the formation. The low-frequency portion of the wave travels at the formation shear wave velocity, allowing for direct shear velocity measurement from the quadrupole wave. Although the quadrupole shear wave has been extensively studied theoretically and a wireline quadrupole-logging tool was also proposed (Winbow et al., 1991 in U.S. Pat. No. 5,027,331), this technology has not yet been commercially applied to the oil and gas industry. This is largely because the wide acceptance and success of the dipole shear wave technology have fulfilled the needs for measuring shear velocity in slow formations.

The acoustic Logging-While-Drilling (LWD) technology has been developed in recent years out of the needs for saving rig-time and for real-time applications such as geosteering and pore pressure determination, among others. The LWD acoustic technology is aimed at measuring the compressional- and shear-wave velocities of an earth formation during drilling. This technology has been successful in the measurement of compressional wave velocity of earth formations. The need for determining the shear wave velocity in slow formations calls for further development of the technology for shear wave measurement capability. Because of the popularity and success of the dipole shear wave technology in wireline logging, this technology is naturally extended to the LWD situation and a LWD dipole acoustic tool has been built and offered for commercial applications.

As discussed later in the application, the application of the dipole acoustic technology to LWD has a serious drawback caused by the presence of the drilling collar with BHA that occupies a large part of the borehole. The drawback is that the formation dipole shear wave traveling along the borehole is severely contaminated by the dipole wave traveling in the collar. There is a need for a method of determination of shear wave velocities of earth formations that is relatively robust in the presence of tool mode waves propagating along the drill collar. The need is particularly acute in situations where the formation shear velocity is less than the velocity of propagation of compressional waves in borehole fluids. The present invention satisfies this need and, additionally, also provides a method for determination of shear velocities in "fast" formations where the shear velocity exceeds the compressional velocity of borehole fluids.

SUMMARY OF THE INVENTION

The present invention is an apparatus and method of determining formation shear properties in a Logging while Drilling environment. In a preferred embodiment of the invention, a transmitter is operated at a frequency below a cut off frequency of a signal propagating through the drill collar so that the signal received at receiver is uncontaminated by the collar mode. The cutoff frequency is determined by the thickness of the drill collar. In a preferred embodiment of the invention, the transmitter is a quadrupole transmitter. The quadrupole mode in a collar has a cutoff frequency that is higher than the quadrupole mode in the formation, so that operating a quadrupole transmitter below this cutoff frequency gives a signal relatively uncontaminated by the tool mode. In a fast formation where the formation shear velocity exceeds the compressional velocity of the borehole fluid, higher order quadrupole modes may be analyzed to determine the formation shear velocity.

In an alternate embodiment of the invention, the transmitter is operated without regard to the cutoff frequency and the received signals are low-pass filtered to reject the tool mode.

In a preferred embodiment, the transmitter comprises eight azimuthally segmented elements. The receiver may be a quadrupole receiver or a dipole receiver. When a dipole receiver is used, the quadrupole transmitter is operated twice with different polarizations and the two received signals are then processed to give a received quadrupole signal The receivers are preferably located between the transmitter and the drillbit. Noise generated by the drillbit is received at the receivers with a direction of propagation opposite that of signals produced by the transmitter. The receivers may be operated as a phased array to reject the noise generated by the drillbit.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

The present invention is a method, system and apparatus for measuring shear wave formation velocities while a well is being drilled. To the extent that the following description is specific to a particular embodiment or a particular use of the invention, this is intended to be illustrative and is not to be construed as limiting the scope of the invention.

Figure 1A:
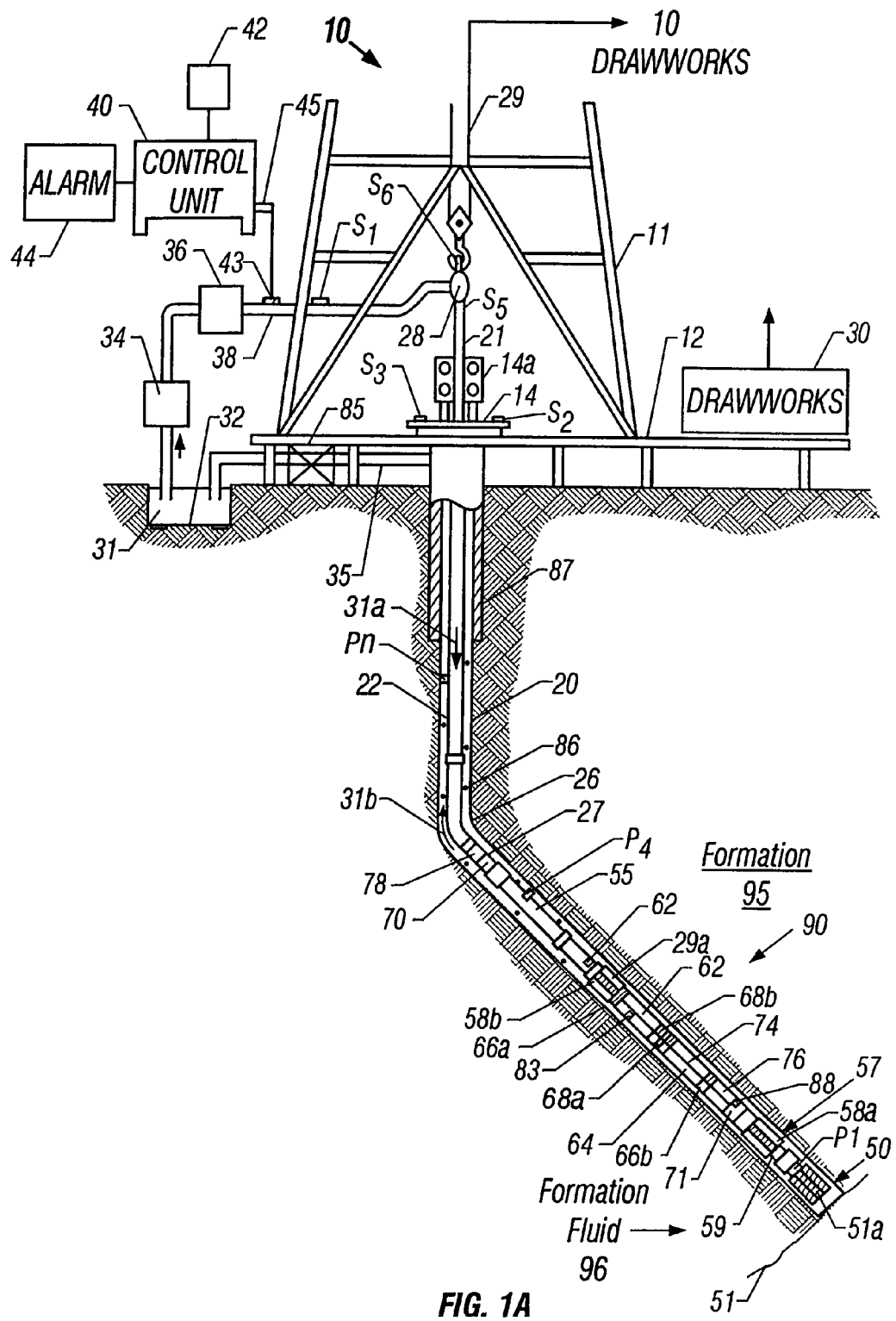
FIG. 1A shows a schematic diagram of a drilling system that employs the apparatus of the current invention in a logging-while-drilling (LWD) embodiment.

FIG. 1A shows a schematic diagram of a drilling system 10 having a bottom hole assembly (BHA) or drilling assembly 90 that includes sensors for downhole wellbore condition and location measurements. The BHA 90 is conveyed in a borehole 26. The drilling system 10 includes a conventional derrick 11 erected on a floor 12 which supports a rotary table 14 that is rotated by a prime mover such as an electric motor (not shown) at a desired rotational speed. The drill string 20 includes a tubing (drill pipe or coiled-tubing) 22 extending downward from the surface into the borehole 26. A drill bit 50, attached to the drill string 20 end, disintegrates the geological formations when it is rotated to drill the borehole 26. The drill string 20 is coupled to a drawworks 30 via a kelly joint 21, swivel 28 and line 29 through a pulley (not shown). Drawworks 30 is operated to control the weight on bit ("WOB"), which is an important parameter that affects the rate of penetration ("ROP"). A tubing injector 14a and a reel (not shown) are used instead of the rotary table 14 to inject the BHA into the wellbore when a coiled-tubing is used as the conveying member 22. The operations of the drawworks 30 and the tubing injector 14a are known in the art and are thus not described in detail herein.

During drilling, a suitable drilling fluid 31 from a mud pit (source) 32 is circulated under pressure through the drill string 20 by a mud pump 34. The drilling fluid passes from the mud pump 34 into the drill string 20 via a desurger 36 and the fluid line 38. The drilling fluid 31 discharges at the borehole bottom 51 through openings in the drill bit 50. The drilling fluid 31 circulates uphole through the annular space 27 between the drill string 20 and the borehole 26 and returns to the mud pit 32 via a return line 35 and drill-cutting screen 85 that removes the drill cuttings 86 from the returning drilling fluid 31b. A sensor $S_1$ in line 38 provides information about the fluid flow rate. A surface torque sensor $S_2$ and a sensor $S_3$ associated with the drill string 20 respectively provide information about the torque and the rotational speed of the drill string 20. Tubing injection speed is determined from the sensor $S_5$, while the sensor $S_6$ provides the hook load of the drill string 20.

In some applications only rotating the drill pipe 22 rotates the drill bit 50. However, in many other applications, a downhole motor 55 (mud motor) is disposed in the drilling assembly 90 to rotate the drill bit 50 and the drill pipe 22 is rotated usually to supplement the rotational power, if required, and to effect changes in the drilling direction. In either case, the ROP for a given BHA largely depends on the WOB or the thrust force on the drill bit 50 and its rotational speed.

The mud motor 55 is coupled to the drill bit 50 via a drive disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the mud motor 55 and the reactive upward loading from the applied weight on bit. A lower stabilizer 58a coupled to the bearing assembly 57 acts as a centralizer for the lowermost portion of the drill string 20.

A surface control unit or processor 40 receives signals from the downhole sensors and devices via a sensor 43 placed in the fluid line 38 and signals from sensors $S_1$–$S_6$ and other sensors used in the system 10 and processes such signals according to programmed instructions provided to the surface control unit 40. The surface control unit 40 displays desired drilling parameters and other information on a display/monitor 42 that is utilized by an operator to control the drilling operations. The surface control unit 40 contains a computer, memory for storing data, recorder for recording data and other peripherals. The surface control unit 40 also includes a simulation model and processes data according to programmed instructions. The control unit 40 is preferably adapted to activate alarms 44 when certain unsafe or undesirable operating conditions occur.

The BHA may also contain formation evaluation sensors or devices for determining resistivity, density and porosity of the formations surrounding the BHA. A gamma ray device for measuring the gamma ray intensity and other nuclear and non-nuclear devices used as measurement-while-drilling devices are suitably included in the BHA 90. As an example, FIG. 1A shows an example resistivity-measuring device 64 in BHA 90. It provides signals from which resistivity of the formation near or in front of the drill bit 50 is determined. The resistivity device 64 has transmitting antennae 66a and 66b spaced from the receiving antennae 68a and 68b. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole computer 70 to determine the resistivity and dielectric values.

An inclinometer 74 and a gamma ray device 76 are suitably placed along the resistivity-measuring device 64 for respectively determining the inclination of the portion of the drill string near the drill bit 50 and the formation gamma ray intensity. Any suitable inclinometer and gamma ray device, however, may be utilized for the purposes of this invention. In addition, position sensors, such as accelerometers, magnetometers or gyroscopic devices may be disposed in the BHA to determine the drill string azimuth, true coordinates and direction in the wellbore 26. Such devices are known in the art and are not described in detail herein.

In the above-described configuration, the mud motor 55 transfers power to the drill bit 50 via one or more hollow shafts that run through the resistivity-measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place. The above described resistivity device, gamma ray device and the inclinometer are preferably placed in a common housing that may be coupled to the motor. The devices for measuring formation porosity, permeability and density (collectively designated by numeral 78) are preferably placed above the mud motor 55. Such devices are known in the art and are thus not described in any detail.

As noted earlier, a significant portion of the current drilling systems, especially for drilling highly deviated and horizontal wellbores, utilize coiled-tubing for conveying the drilling assembly downhole. In such application a thruster 71 is deployed in the drill string 90 to provide the required force on the drill bit. For the purpose of this invention, the term weight on bit is used to denote the force on the bit applied to the drill bit during the drilling operation, whether applied by adjusting the weight of the drill string or by thrusters. Also, when coiled-tubing is utilized a rotary table does not rotate the tubing; instead it is injected into the wellbore by a suitable injector 14a while the downhole motor 55 rotates the drill bit 50.

Figure 1B:
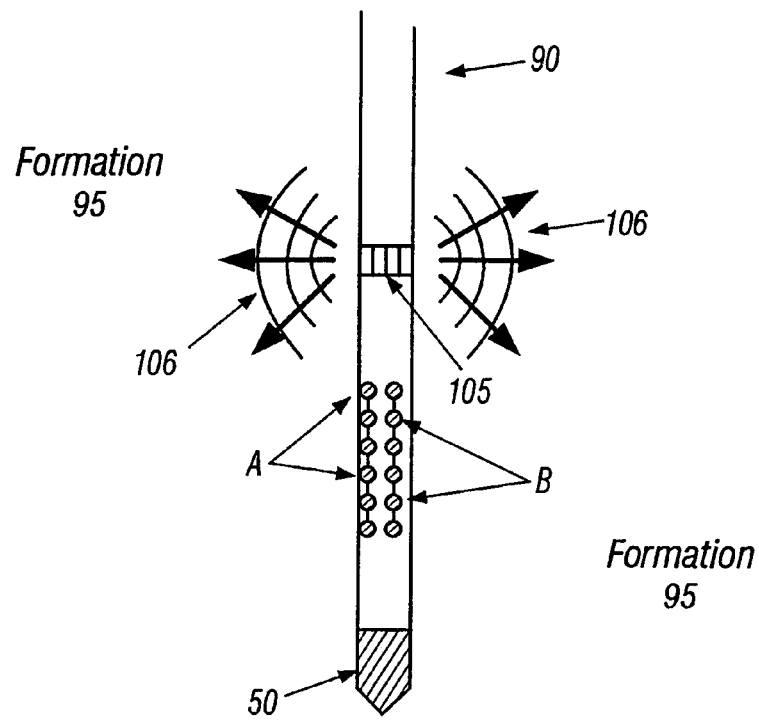
FIG. 1B illustrates a LWD tool on a drill collar.

FIG. 1B is a schematic view of an acoustic logging while drilling tool system on a BHA drill collar 90 containing a drill bit 50. This system is mounted on the BHA drill collar 90 for performing acoustic measurements while the formation is being drilled. The acoustic logging while drilling tool system has a source 105 to emit acoustic vibrations 106 that may traverse formation 95 and may also be propagated along the borehole wall and be received by sensors A and B which may be in arrays. These sensors are discussed later in the application. A point to note is that the sensors are disposed between the transmitter and the receiver. This has important benefits in that the desired signal produced by the transmitter travels in a direction opposite to the direction of noise generated by the drillbit 50. This makes it possible to use suitable filtering techniques, including phased arrays, to greatly reduce the drillbit noise. In an alternated embodiment of the invention, the transmitter 105 may be located between the sensors and the drillbit 50

The application of the dipole acoustic technology to LWD has a serious drawback caused by the presence of the drilling collar with BHA that occupies a large part of the borehole. The drawback is that the formation dipole shear wave traveling along the borehole is severely contaminated by the dipole wave traveling in the collar. This is demonstrated by the following theoretical analysis/numerical modeling results.

The dipole wave excitation and propagation characteristics for a borehole with a drilling collar are analyzed. Using known analyses methods, for example the analyses of the type described in Schmitt (1988), one can calculate the velocity dispersion curve for the formation and collar dipole shear (flexural) waves. The dispersion curve describes the velocity variation of a wave mode with frequency. In the example, the borehole diameter is 23.84 cm and the inner- and outer diameter of the collar is 5.4 and 18 cm. respectively. The inner collar column and the annulus column between the collar and borehole are filled with drilling mud whose acoustic velocity and density are 1,470 m/s and 1 g/cc, respectively. The collar is made of steel (compressional velocity, shear velocity and density of steel are 5,860 m/s, 3,130 m/s, and 7.85 g/cc, respectively). The formation is acoustically slow with compressional velocity of 2,300 m/s, shear velocity 1,000 m/s, and density 2 g/cc. It is to be noted that the example is for illustrative purposes only and not intended to be a limitation on the scope of the invention.

Figure 2:
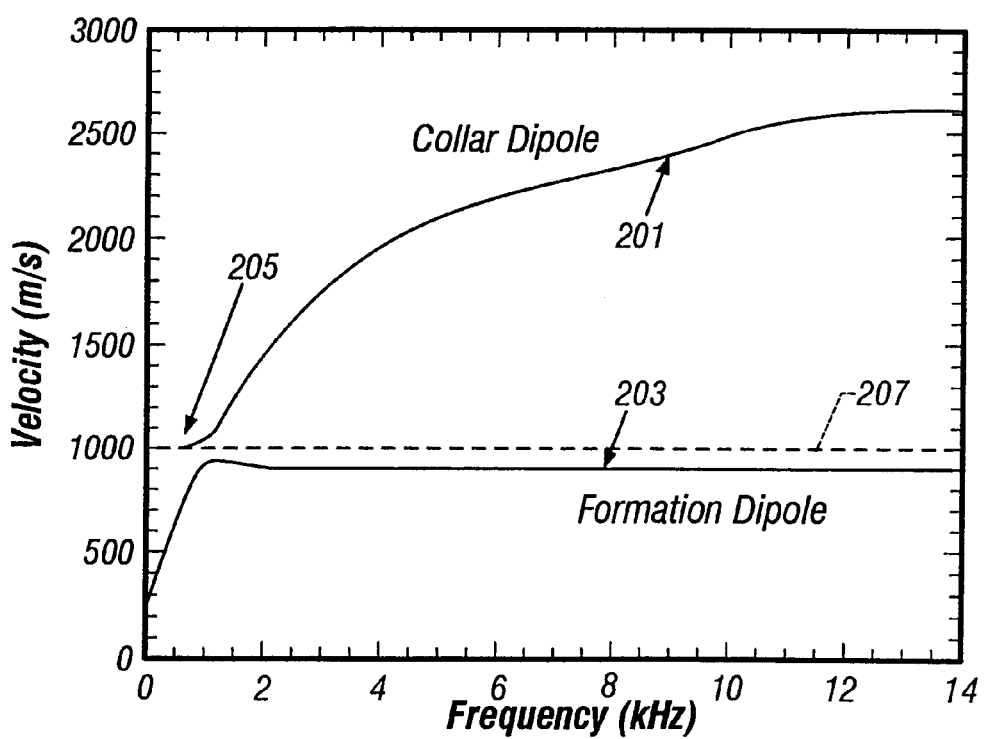
FIG. 2 illustrates velocity dispersion curves for formation and drill-collar dipole modes.

The calculated drilling collar and formation flexural wave dispersion curves for dipole modes are shown in FIG. 2, for the frequency range shown as the horizontal axis of 0 to 14 kHz. The collar dipole wave dispersion curve 201 displayed along the vertical axis shows how velocity of the collar dipole wave varies with frequency over the range 0 to 14 kHz. The formation dipole wave dispersion curve 203 shows that except for low frequencies in this range, there is relatively little change in velocity. The formation and collar flexural wave modes coexist almost for the entire frequency range, except at the very low frequency where the collar flexural mode appears to terminate at the formation shear velocity. Below the frequency where the collar mode terminates, the formation flexural mode velocity appears to continue the collar flexural mode behavior that would exist in the absence of the formation, the velocity decreasing to zero at the zero frequency. This cross-over phenomenon is caused by the strong acoustic interaction between the collar and the formation in this dipole excitation situation.

Figure 3:
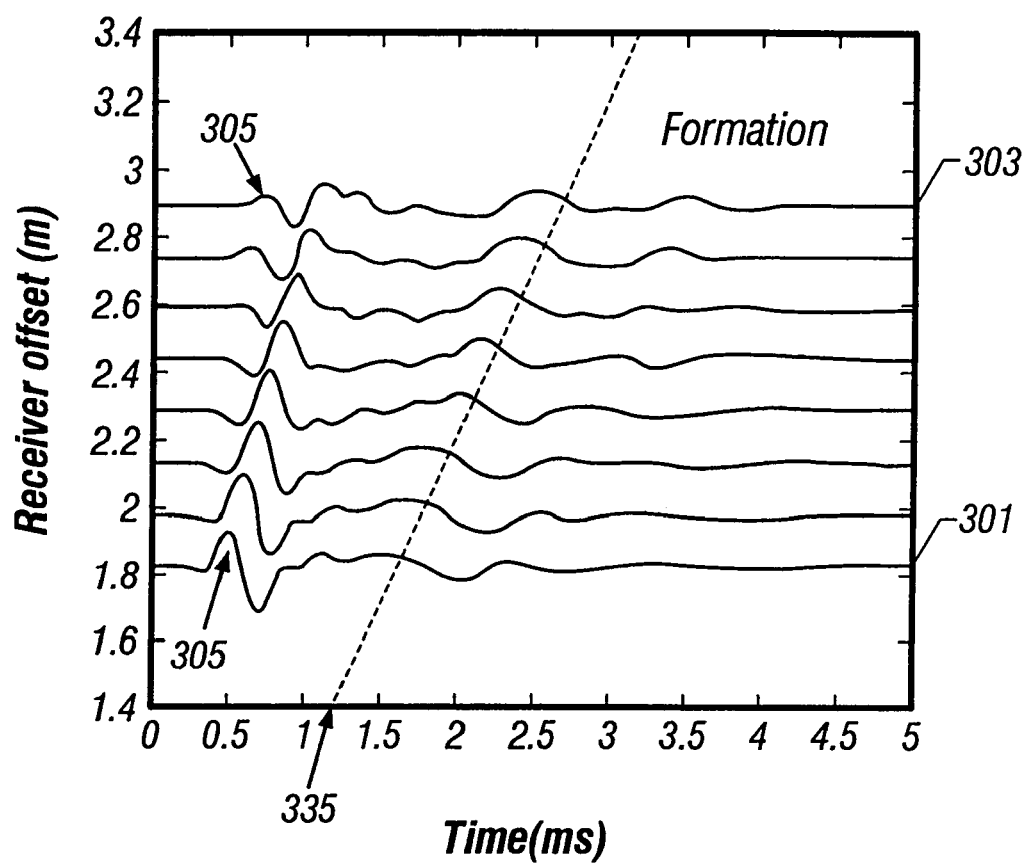
FIG. 3 illustrates dipole acoustic waveforms in the presence of a drilling collar.

Dipole acoustic wave propagation in a borehole with a drilling collar may be simulated with numerical finite difference techniques, for example as described in Cheng et al. (1995). The model parameters are the same as used in the above velocity dispersion calculation example. The dipole source and an array of receivers are placed on the rim of the collar. The source excitation center frequency is 2 kHz. FIG. 3 shows the simulated dipole acoustic waveforms displayed with time along the horizontal axis. Dipole acoustic waveforms are displayed by offset corresponding to source-receiver distance along the vertical axis in FIG. 3. Receiver locations are spaced 0.1524 m apart beginning with the near trace waveform at 1.833 m 301 to 2.9 m 303 offset from the source. The dipole acoustic waveforms are dominated by the collar flexural wave that has a faster velocity and a dispersive character. The initial strong impulses 305 of the dispersive collar flexural wave are followed in time by dispersive energy that is stronger than the flexural wave of interest representing the formation S-wave. The dashed line 335 represents the arrival location and velocity of the formation flexural wave. The formation flexural wave of interest, aligned with dashed line 335, is smaller in amplitude compared with the collar flexural wave, and is severely contaminated by the interaction of the collar flexural wave.

The above velocity dispersion calculation and wave propagation simulation results demonstrate that there is a strong interaction between formation and drilling collar flexural waves. The fundamental cause of this is that the two wave modes coexist in the same frequency range of interest. There are several drawbacks of the LWD dipole technology for shear velocity measurement. The first is the difficulty in obtaining good quality formation flexural wave measurements in the presence of severe contamination from the collar flexural wave. The collar wave, being a low-frequency mode, is difficult to suppress using attenuation techniques such as cutting grooves and/or inserting absorptive materials in the collar, etc. The second drawback is that the formation flexural wave, even if it could be reliably measured, cannot yield accurate formation shear velocity information because of the collar interaction. As can be seen from FIG. 2, the high frequency limit of the collar mode approaches the shear velocity of the collar and at the frequency 205 where the collar dipole mode ceases to exist, the velocity of the collar dipole mode is the formation shear velocity 207. The velocity 203 of the formation dipole mode is, at all frequencies, below the formation shear velocity 205. In the absence of a collar, when excited at low frequencies, the formation dipole mode would propagate at a velocity equal to the formation shear velocity. Determination of the formation shear velocity from the dispersion curves of either the formation dipole mode or the collar dipole mode not an easy matter. In addition, during drilling operations, there is a strong dipole mode excited by the drillbit that produces additional noise. For the foregoing reasons, it is difficult, if not impossible, to measure formation shear wave velocity using the dipole acoustic technology in the LWD environment.

The preferred manner of deploying certain sensors for LWD shear wave data acquisition, for example in drill string BHA 90 of FIGS. 1A and 1B will now be described. The actual BHA utilized for a particular application may contain some or all of the sensors described in the background section, in addition to the present invention. For the purpose of this invention any such BHA could contain one or more seismic sources and receivers (collectively represented herein by numeral 88) at a suitable location in the BHA 90.

Figure 4A:
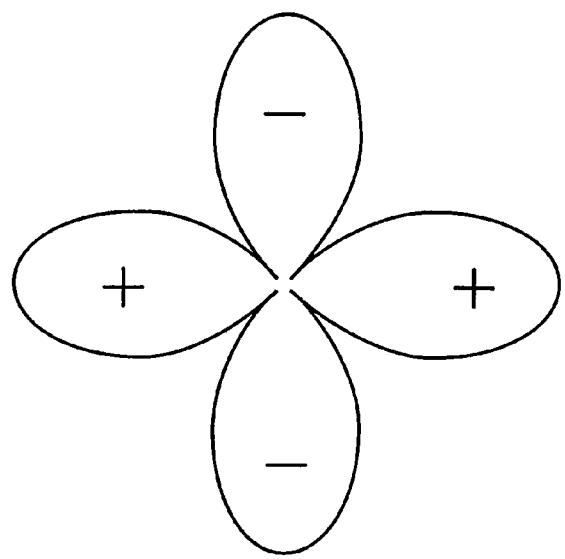
FIG. 4A shows is a schematic illustration of the field for a quadrupole wave.

This invention incorporates a quadrupole acoustic technology for the LWD shear velocity measurement. FIG. 4*a* shows an illustration of a quadrupole field. It shows a characteristic four-lobed pattern that may be substantially characterized by a cos 2θ azimuthal variation. In the present instance, the field may be associated with particle motion or with pressure. The greatest advantage of using the quadrupole wave is that the collar quadrupole wave exists only above a certain frequency called the cut-off frequency. This frequency depends on the drilling collar thickness and borehole size. Thus, by determining the cut-off frequency for the collar and borehole dimensions, one can select a frequency band in which only the formation quadrupole shear wave is excited. Determining the velocity of the formation quadrupole wave will fulfill the needs for shear wave velocity measurement in the LWD environment. This is different from the situation in wireline logging: while Winbow does discuss the use of quadrupole logging on a wireline device, there is no discussion of a cutoff frequency of a quadrupole wave. Winbow teaches a wireline logging device. As would be known to those versed in the art, the tool diameter in wireline devices is typically much smaller than the borehole diameter. Chen has also discussed the use of a quadrupole source for shear wave logging and shows a comparison of experimental results with theoretical dispersion curves for Stoneley waves within the borehole. The tool diameter Chen's model is less than half the borehole diameter. As would be known to those versed in the art, Stoneley waves are interface waves propagating along the wall of the borehole. In contrast, the present invention deals with a MWD device wherein the diameter of the drill collar is almost the same as the diameter of the borehole. In such a case, the collar mode becomes important. This collar mode is different from the Stoneley waves discussed in Chen.

Figure 4B:
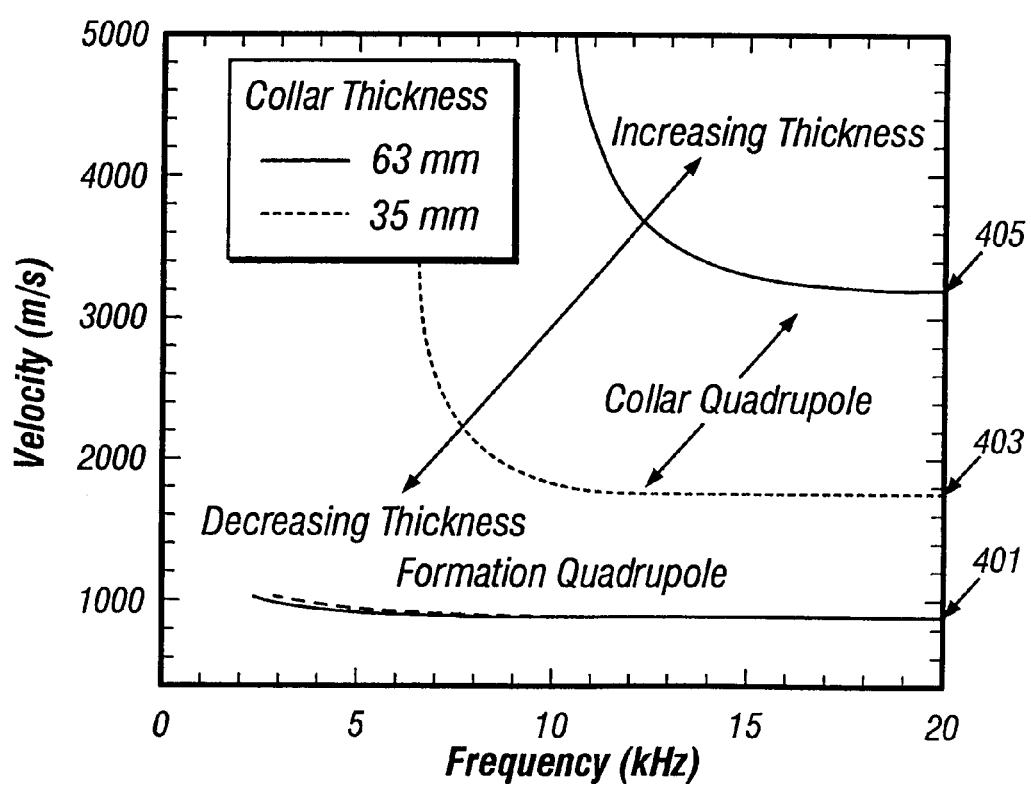
FIG. 4B illustrates velocity dispersion curves for formation and drill-collar quadrupole modes.

The feasibility of determining formation shear velocity from quadrupole wave measurement is demonstrated using theoretical/numerical analysis examples. FIGS. 4–*b* shows the velocity dispersion curves of the formation 401 and collar quadrupole waves 403 and 405. Velocity in meter per second (m/s) is displayed along the vertical axis and frequency in kilohertz (kHz) along the horizontal axis. The velocity dispersion curve for an exemplary collar of thickness 35 mm is shown as curve 403. The velocity dispersion curve for an exemplary collar of thickness 63 mm is shown as curve 405. The formation quadrupole wave is slightly dispersive and reaches the formation shear wave velocity at a low cut-off frequency (around 2 kHz in this case). This indicates that formation shear wave velocity can be determined as the low frequency limit of the velocity of formation quadrupole waves. The collar quadrupole wave velocity curve shows very high values due to the high shear rigidity (steel) and thick wall (63 mm) of the drilling collar. The collar wave for the 63 mm thick collar 405, however, exists only-in the frequency range above 10 kHz; whereas, the required frequency for shear velocity measurement of the formation is around 2 kHz, well separated from the frequency range (>10 kHz) of the collar wave. This frequency separation allows for designing a method and apparatus to generate quadrupole waves only in a predetermined frequency band (0–10 kHz in this case). In this band, only the formation quadrupole wave is generated. This wave excitation/generation scheme may be demonstrated using finite difference simulations.

Figure 5A:
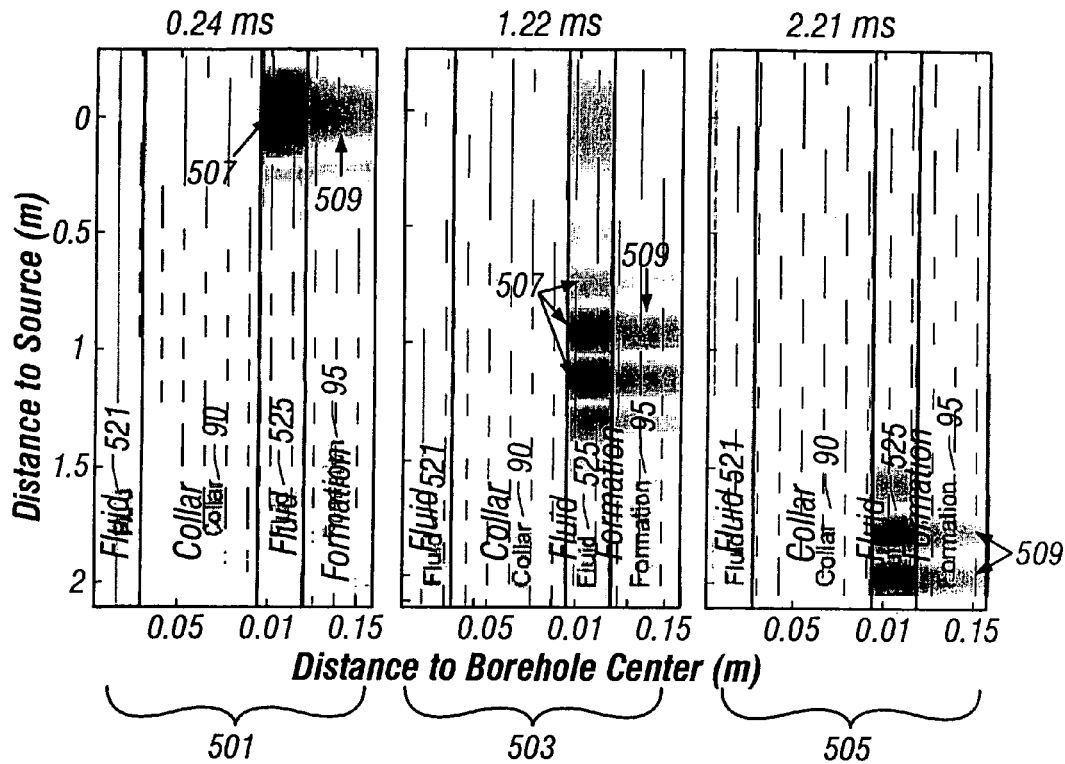
FIG. 5A illustrates wavefield snapshots of acoustic energy near the borehole, where radial particle velocity associated with the quadrupole wave motion is displayed.

In a finite difference modeling, a quadrupole source and an array of receivers with a 0.1524 m. spacing are placed at the rim of the collar. The source wavelet center frequency is chosen to be 2 kHz, the amplitude spectrum of the source wavelet diminishing to zero at about 5 kHz, which is below 10 kHz, the cut-off frequency of the collar quadrupole wave. FIG. 5a shows three snapshots in time of the wavefield intensity due to the quadrupole source. Each snapshot, 501, 503, and 505 is a cross-section displaying a fluid inside the drill collar 521, the drill collar 90, fluid 523 outside the drill collar, and a formation 95. Radial particle velocity associated with the quadrupole wave motion is displayed shaded 507, 509. These FIG. 5a snapshots display the locations of wavefield intensity at several instants of time (0.24 milliseconds for 501, 1.22 milliseconds for 503, and 2.21 milliseconds for 505, respectively). In the borehole fluid annulus high wavefield intensity is seen 507 and high wavefield intensity is seen in the formation 509. The wave motion in the fluid annulus and the motion in the formation are in phase, traveling at the formation shear velocity as demonstrated by the juxtaposition of high wavefield intensity in the fluid 507 and the formation 509 for all three snapshots 501, 503 and 505. This is the formation quadrupole wave as discussed in connection with FIG. 4. There is almost no discernable wave intensity for locations anywhere inside the collar except for the initial time (snapshot 0.24 ms 501) around the source, showing that the collar quadrupole wave is not excited in this frequency band for this collar thickness (2.48 inches).

Figure 5B:
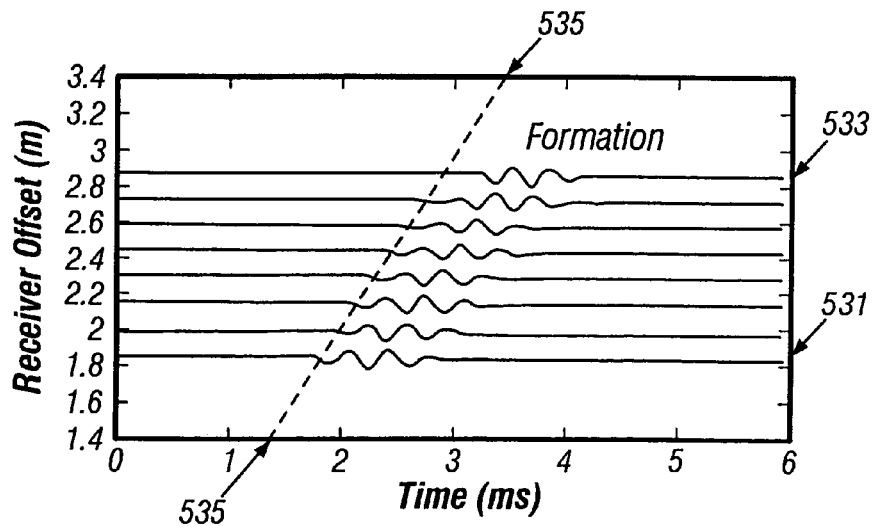
FIG. 5B illustrates quadrupole waveforms at various offsets.

The time-domain quadrupole waveforms of the receiver array are displayed in FIG. 5B where time is represented along the horizontal axis. Quadrupole acoustic waveforms are displayed by offset corresponding to source-receiver distance along the vertical axis in FIG. 5B. Receiver locations are spaced 0.1524 m apart beginning with the near trace waveform at 1.833 m 531 to 2.9 m 533 offset from the source. FIG. 5B shows only one wave, the formation quadrupole wave, traveling across the array at the formation shear velocity. The dashed line 535 marks the formation quadrupole wave first arrival. This time-domain wave simulation result is consistent with the frequency domain dispersion analysis result of FIG. 4. These examples demonstrate that choosing an appropriate wave excitation frequency band can eliminate collar quadrupole waves.

The excitation frequency band should be selected based on the drilling collar and borehole dimensions. In drilling practice, the size of the borehole is varied to suit exploration/ production needs and/or geological environment of the well to be drilled. Accordingly, the size of the drilling collar also varies. The change of the collar and borehole dimensions, especially the former, will significantly change the collar quadrupole wave characteristics. This, again, can be demonstrated using theoretical/numerical analysis examples. The quadrupole dispersion curves for a 35 mm thickness drilling collar (dashed curves) are shown in FIG. 4. With the thinner collar, the formation quadrupole dispersion curve (dashed line 403) is also changed. The cut-off frequency of the formation mode is raised to about 3 kHz and the whole curve exhibits higher values compared to the thick collar case (solid curve 405). The curve approaches the formation shear wave velocity at low frequencies. On the other hand, the collar quadrupole wave velocity is much reduced compared to the thick collar case (solid curve 405) and shows a much lower cut-off frequency (about 6 kHz). The general trend shown in FIG. 4 is that increasing the collar thickness will move the frequency band of the collar quadrupole wave away from that of the formation quadrupole wave. When the frequency band of the collar quadrupole wave is close to that of the formation quadrupole, measurement of the formation quadrupole wave will be severely impaired, as the following wave simulation example demonstrates.

Figure 6A:
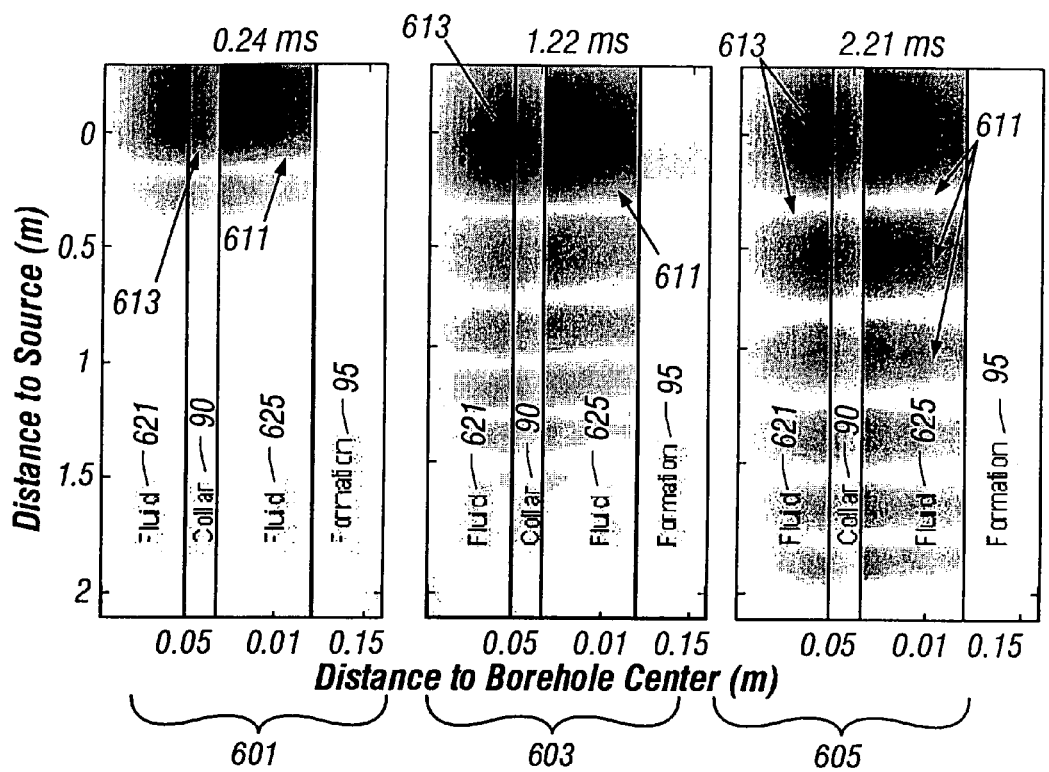
FIG. 6A illustrates wavefield snapshots of acoustic energy near the borehole, where radial particle velocity associated with the quadrupole wave motion in a thin-collared pipe is displayed.

The example case is where the collar pipe is relatively thin (thickness is only 16 mm or 0.63 inches). The cut-off frequency of the collar quadrupole wave is now about 3.5 kHz. Other parameters, as used in the simulation of FIG. 5B, are kept unchanged. With the 2 kHz center excitation frequency, both formation and collar quadrupole waves are excited. FIG. 6A is the counterpart of FIG. 5A, showing the wavefield snapshots for the 16 mm thick collar case. FIG. 6A shows three snapshots in time of the wavefield intensity due to the quadrupole source. Each snapshot, 601, 603, and 605 is a cross-section displaying a fluid 621 inside the drill collar, drill collar 90, fluid 625 outside the drill collar, and a formation 95. Radial particle velocity associated with the quadrupole wave motion is displayed shaded 611, 613. These FIG. 6A snapshots display the locations of wavefield intensity at several instants of time (0.24 milliseconds for 601, 1.22 milliseconds for 603, and 2.21 milliseconds for 605, respectively). In the borehole fluid 625 annulus high wavefield intensity is seen 611 and high wavefield intensity is seen in the collar 613. For all the three time instants 601, 603 and 605, the wavefield intensity in the entire borehole containing the collar is dominated by the collar quadrupole wave. Formation quadrupole wave is weakly excited, which is out of phase with the collar wave.

Figure 6B:
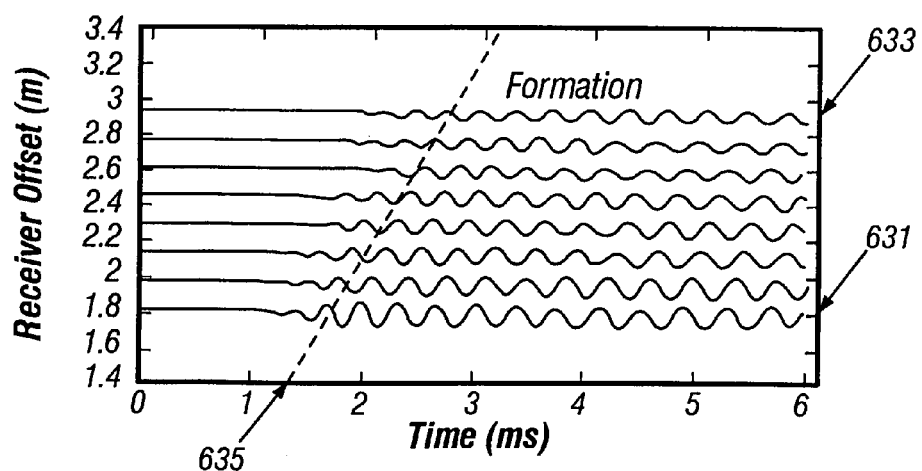
FIG. 6B shows time domain displays of the data in FIG. 6A.

The time domain array waveforms are shown in FIG. 6B. The time-domain quadrupole waveforms of the receiver array are displayed in FIG. 6B where time is represented along the horizontal axis. Quadrupole acoustic waveforms are displayed by offset corresponding to source-receiver distance along the vertical axis in FIG. 6B. Receiver locations are spaced 0.1524 m apart beginning with the near trace waveform at 1.833 m 631 to 2.9 m 633 offset from the source. The time domain waveforms are dominated by the collar quadrupole wave that has a moveout velocity of about 1,300 m/s. The dashed line 635 represents the arrival time for the formation quadrupole wave. In this case, it is difficult to measure the formation quadrupole wave in the presence of the strong collar wave. This example demonstrates the importance of the frequency band selection for the LWD quadrupole wave generation and measurement devices.

Figure 7:
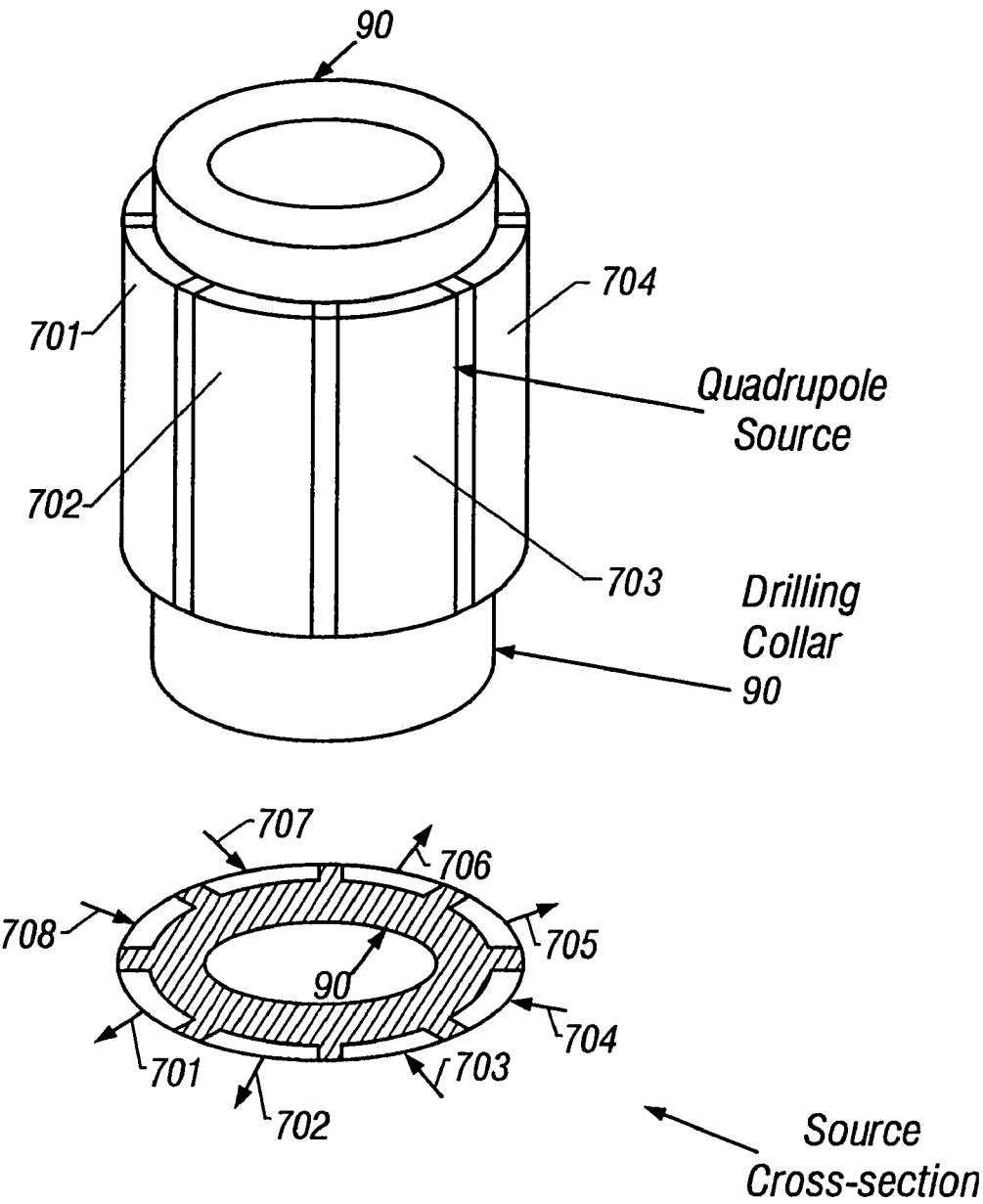
FIG. 7 illustrates a simplified perspective view of a source cross-section in conjunction with the drilling collar.

The above examples demonstrate the advantage of the quadrupole shear wave in the LWD environment and the requirements that facilitate making the LWD quadrupole shear wave measurement. As a result, a quadrupole LWD shear wave system can be constructed. Quadrupole shear waves in the LWD environment can be generated using a quadrupole source mounted on the drilling collar 90. FIG. 7 is a simplified perspective view of the source cross-section in conjunction with the drilling collar. As shown in FIG. 7, the quadrupole source comprises the drilling collar 90 and eight members of equal dimension. The sections are number 701–708. These members are eight equal sectors of the source cylinder. The cylinder sections are made from either an electrostrictive (or piezoelectric) or a magnetostrictive material capable of generating stress/pressure wave signals from the input electric pulse. In an alternate embodiment of the invention (not shown) the sections comprise electromechanical devices of such devices are shown in U.S. Pat. No. 5,852,262 to Gill, the contents of which are incorporated herein by reference. Included in the teachings of Gill is an actuator that produces a pressure pulse. By use of suitably configured portholes, dipole or quadrupole pulses may be produced. Bender bars may also be used. Although dividing the source cylinder into four equal sectors suffices to produce a quadrupole source, using eight (or any multiple of four) sectors for the source reduces the mass of each sector so they more easily withstand drilling vibrations. While the description of the source herein uses eight source segments as an example, those versed in the art would recognize how any multiple of four sources could be excited to produce a quadrupole signal.

The lower part of FIG. 7 is a cross-sectional view of the quadrupole shear wave source on the plane perpendicular to the axis of the drilling collar. The elements of the source device are, in one embodiment, eight sectors labeled 701, 702, 703, 704, 705, 706, 707 and 708. When electrical pulses are applied to the source, each sector will expand or contract in a radially outward or inward manner. Specifically, the electrical pulses can be applied such that sectors (701, 702) and diametrically opposed sectors (705, 706) will expand and simultaneously, sectors (703, 704) and sectors (707, 708) will contract, as illustrated in FIG. 7. Then four stress/pressure waves will be generated in the surrounding borehole fluid/formation, as well as in the drilling collar. It is also to be noted that when a device such as that taught in Gill is used, there may only be a single actuator that produces quadrupole signals from suitable portholes.

When all eight sectors are made from the same material and the electrical pulses applied to them have substantially the same amplitude, then the interaction of the four pressure/stress waves inside the drilling collar and in the surrounding borehole/formation will produce quadrupole shear waves. More specifically, if the electrical pulses are modulated such that the frequency band of the generated pressure/stress waves is below the cut-off frequency of the quadrupole shear wave in the drilling collar, then the interaction of the four stress waves in the collar will cancel each other. The interaction of the pressure/stress wave in the borehole and formation will produce a formation quadrupole shear wave to propagate longitudinally along the borehole. This frequency band modulation of the source pulses is part of one embodiment of the present invention.

Figure 8:
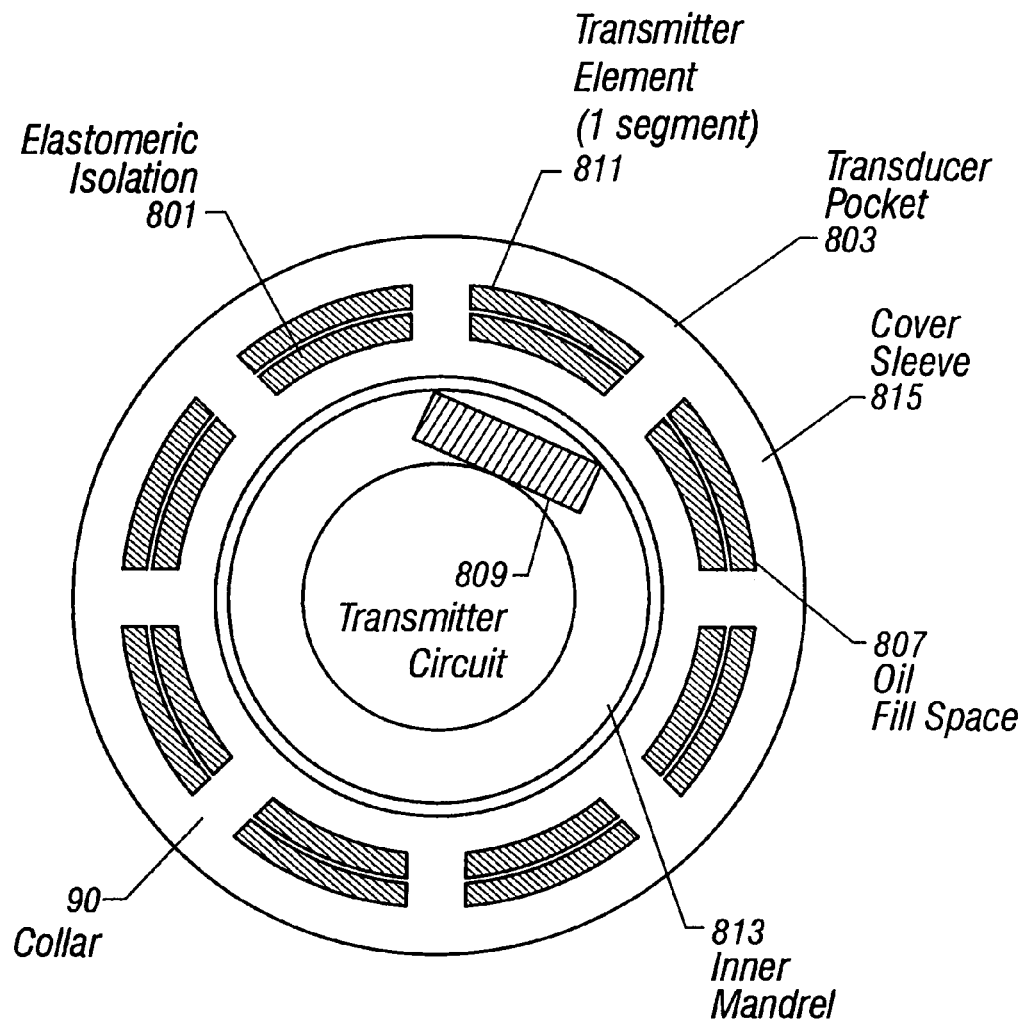
FIG. 8 illustrates a detailed cross-sectional view of a segmented ring transmitting implementation of a source.

An actual implementation of the quadrupole shear wave source is now described in more detail. FIG. 8 illustrates a detailed cross-sectional view of a segmented ring transmitter implementation. This implementation has a segmented ring mounted on an elastomeric isolation component 801 in a continuous pocket 803 around the collar 90. The isolation component is used to reduce drill string induced acoustic signals. The sensor sub assembly can be oil-filled with a cover sleeve 807, as illustrated, or it can be a potted assembly, requiring no oil. An electronic drive circuit(s) 809 is coupled to the transmitter element(s) 811 to excite acoustic signal(s) into the borehole and formation. A cover sleeve 815 may cover transmitter elements 811. The electronic drive circuit 809 may be placed in the inner mandrel 813. The transmitting element(s) 811 can be implemented in various forms to include rings, cylinders, plates, and piston or solenoid elements. The number of segments can be increased in circumferential and/or axial direction as needed.

Figure 9:
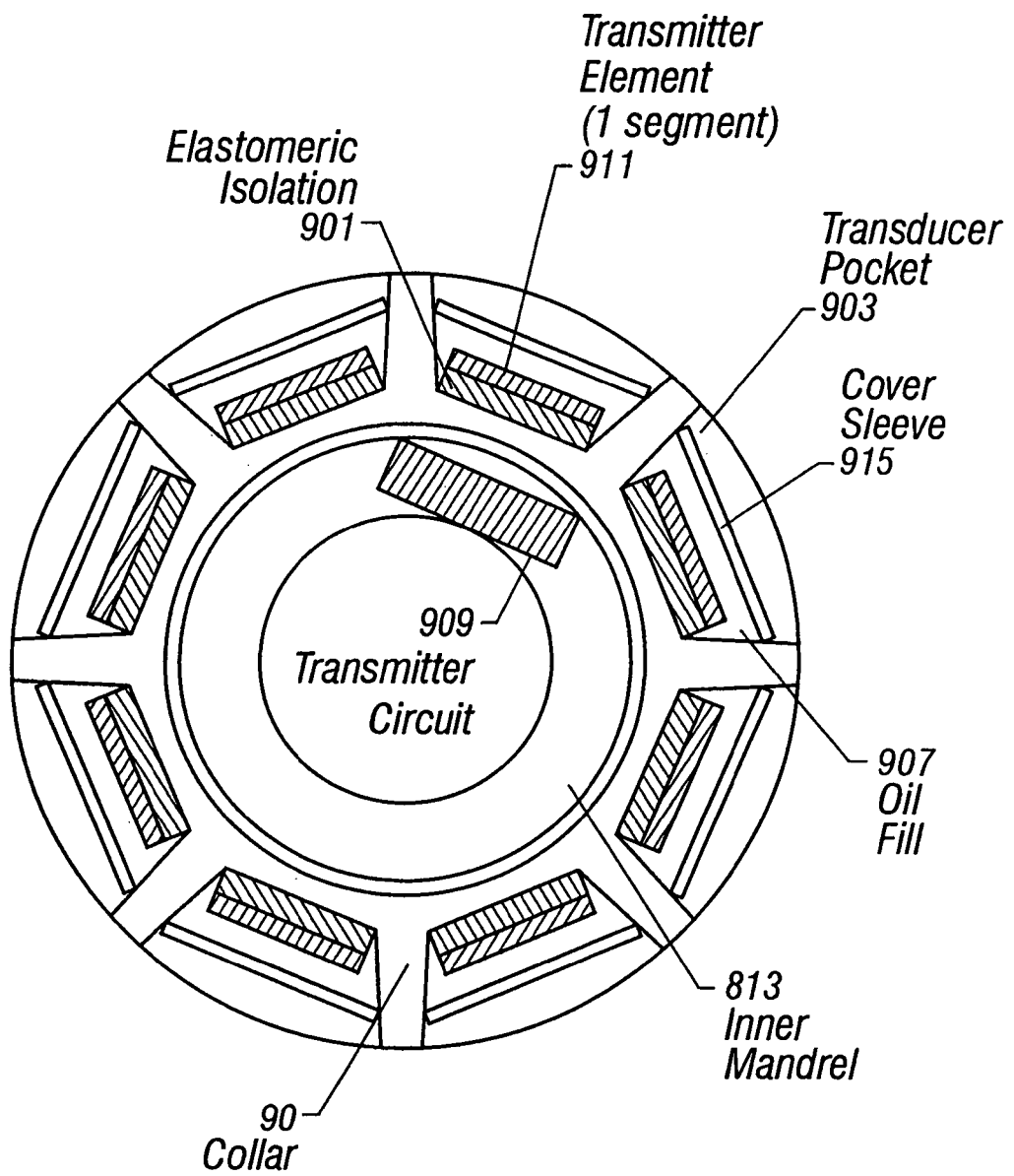
FIG. 9 illustrates a detailed cross-sectional view of a compartmentalized segmented transmitting implementation of a source.

FIG. 9 illustrates a detailed cross-sectional view of a compartmentalized segmented transmitting implementation which has segments mounted on individual elastomeric isolation components 901 in compartmentalized pockets 903 around the collar 90. There may be oil fill 907 between the transmitting element 911 and a cover sleeve 915. The transmitting electronics 909 may reside in the inner mandrel 813.

The quadrupole shear wave in the earth formation produced by the above described quadrupole source may be detected at locations spaced longitudinally along the borehole from the source, as schematically illustrated in FIG. 1B. FIG. 1B is a schematic view of an acoustic logging while drilling tool system on a BHA drill collar 90 containing a drill bit 50. This system is mounted on the BHA drill collar 90 for performing acoustic measurements while the formation is being drilled. The acoustic logging while drilling tool system may have a source 105 to emit acoustic vibrations 106 that may traverse formation 95 and be received by sensors A and B which may be in arrays. The use of arrays with axially spaced apart elements as shown in FIG. 1B makes it possible to use well-known phased array filtering techniques for attenuating signals traveling in a particular direction with a specified range of velocities. In a preferred embodiment of the invention, this phased array filtering is used to attenuate noise generated by the borehole. The phased array filtering may also be used to attenuate the collar mode by defining a range of velocities to be attenuated. In an alternate embodiment of the invention, a plurality of axially spaced apart transmitter elements is used and the phased array filtering is used to reduce the generation of collar mode signals.

Figure 10:
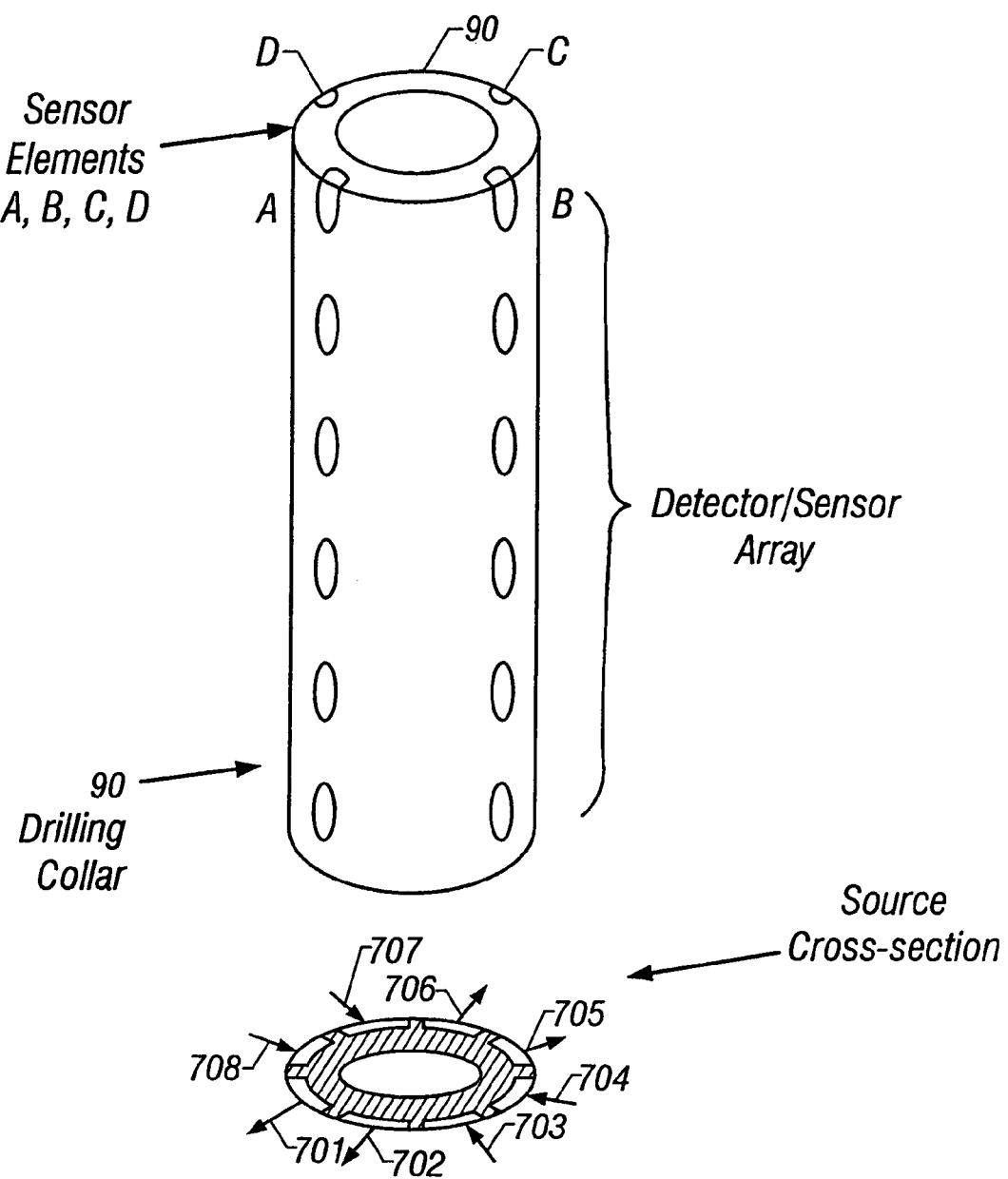
FIG. 10 is a perspective view of the sensor layout around the collar.

As shown in FIG. 10 for an embodiment of the present invention, acoustic detectors may be mounted at the rim of the drilling collar. Each detector consists of four similar sensors circumferentially spaced around the collar, for example sequentially named as A, B, C, and D. FIG. 10 is a perspective view of a sensor layout around the collar in relation to source elements as described in FIG. 7. The center of each sensor is longitudinally aligned with a junction of two source sectors that expand/contract simultaneously. For example, sensor A is aligned with the junction between source sectors 701 and 702, sensor B is aligned with the junction between source sectors 703 and 704, etc. The four-sensor detector acts to enhance the efficiency of the quadrupole source and to remove possible contamination from a monopole component of the wave signal.

Figure 11:
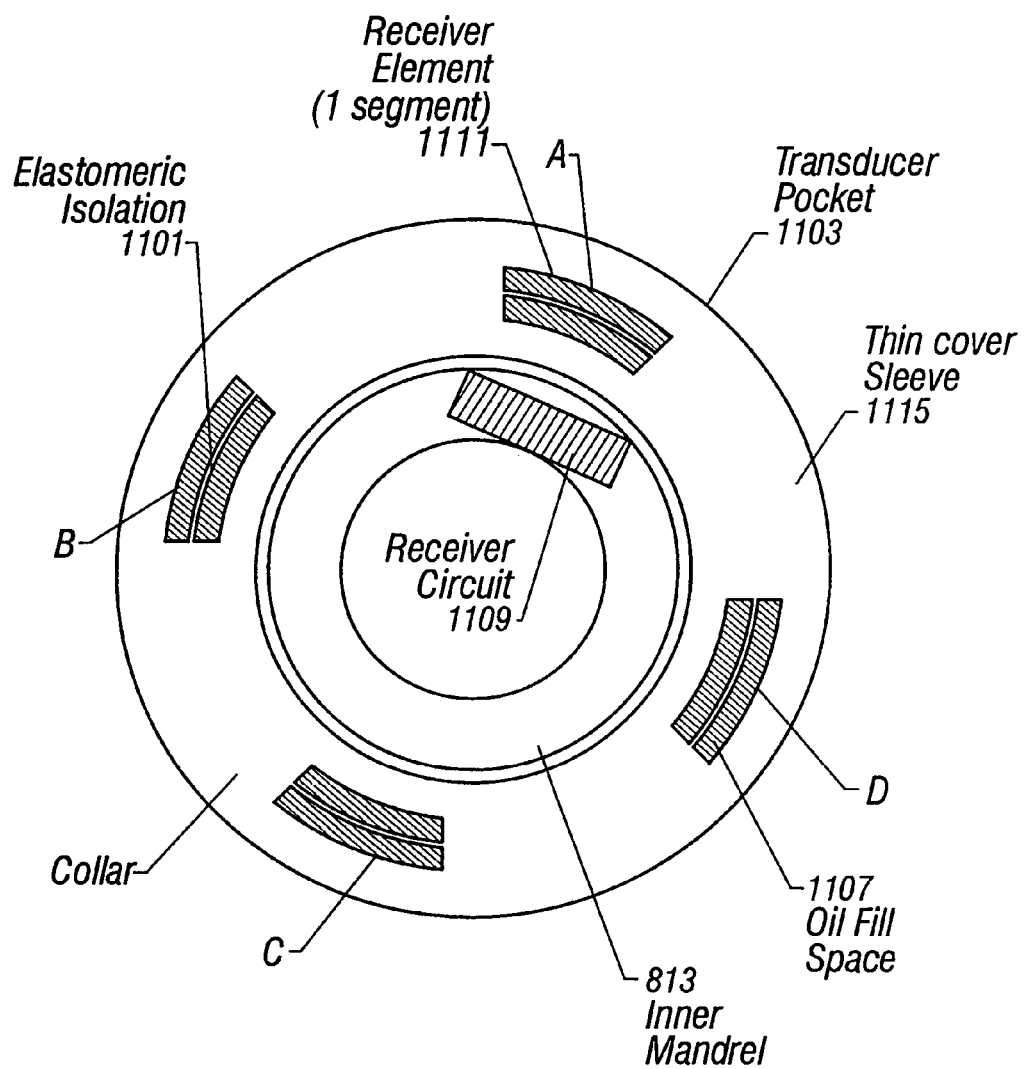
FIG. 11 illustrates a detailed cross-sectional view of a segmented ring receiving sensor implementation.

An actual implementation of the quadrupole shear wave receivers as quadrupole detector arrays is now described in more detail. FIG. 11 illustrates a detailed cross-sectional view of a segmented ring receiving sensor implementation which has a segmented ring mounted on an elastomeric isolation component 1101 in a continuous pocket 1103 around the collar 90. The isolation is used to reduce drill string induced signals. The sensor sub assembly can be oil-filled 1107 with a cover sleeve 1115, as illustrated or it can be a potted assembly, requiring no oil. An electronic signal conditioning circuit(s) 1109 is coupled to the receiver element(s) 1111 to sense acoustic signal(s) in the borehole and formation. The receiver circuit 1109 may reside within the inner mandrel 813. The receiving element(s) can be implemented in various forms to include rings, cylinders, plates, and piston or solenoid elements. The number of segments can be increased in a circumferential and/or axial direction as needed. The material for the receiver elements may be selected from a piezoelectric material, an electrostrictive material; and, a magnetostrictive material.

Figure 12:
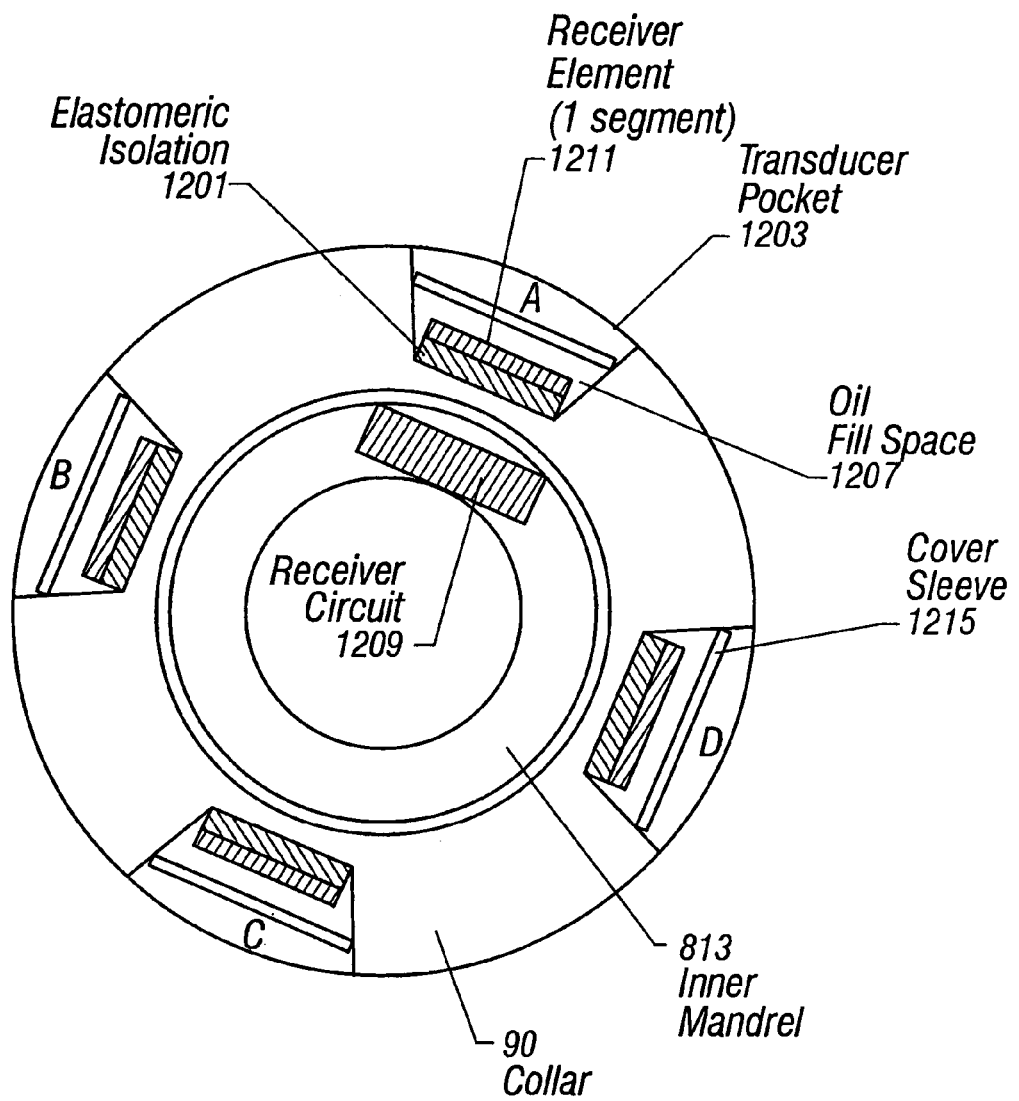
FIG. 12 illustrates a detailed cross-sectional view of a compartmentalized segmented receiving sensor implementation.

FIG. 12 illustrates a detailed cross-sectional view of a compartmentalized segmented receiving sensor implementation which has receiver segments 1211 mounted on individual elastomeric isolation components 1201 in compartmentalized pockets 1203 around the collar 90. The inner mandrel 813 holds receiver circuit 1209, which is coupled with a receiver element 1211. The receiver element 1211 has a cover sleeve 1215 with an oil filled space 1207 in between.

Copending U.S. patent application Ser. No. 09/590,906, the contents of which are fully incorporated herein by reference, teaches how a quadrupole mode may obtained by suitable combination of signals received by two receiver elements with two different excitations of a quadrupole transmitter.

Figure 13A:
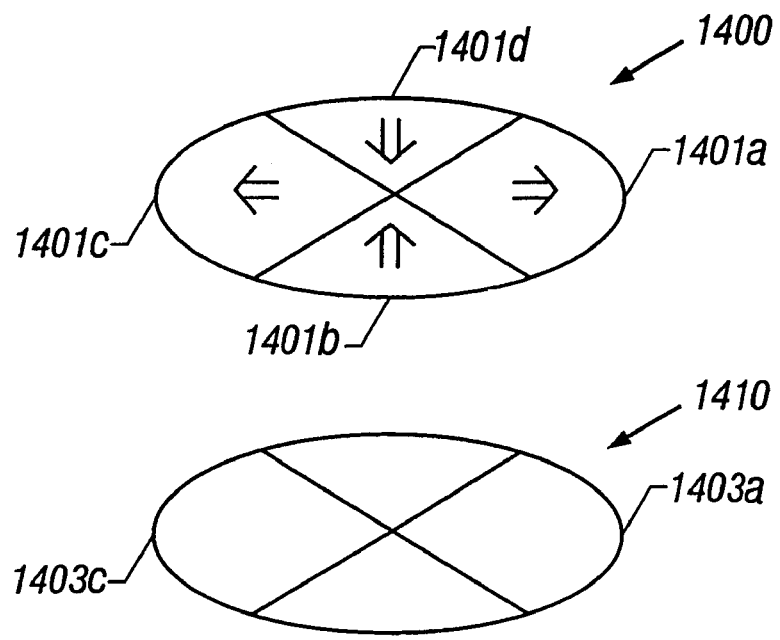
FIGS. 13A and 13B show the preset invention using two receiver elements for detection of quadrupole signals.
Figure 13B:
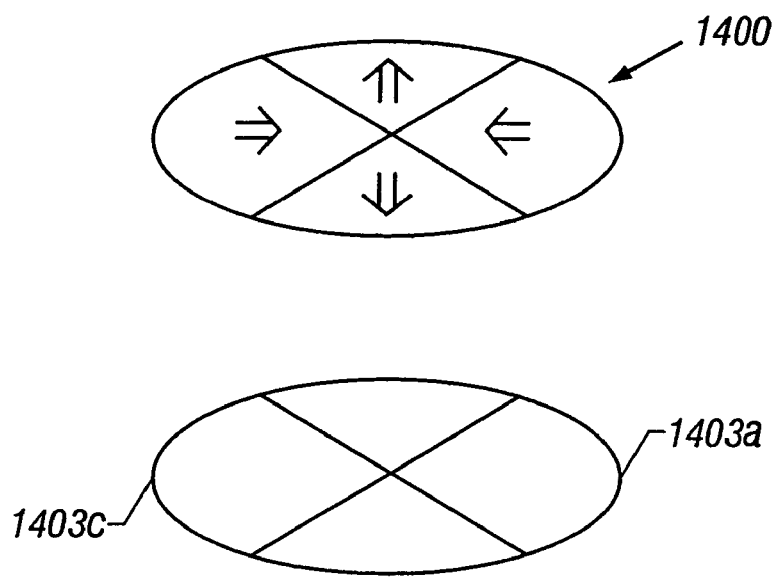

This is illustrated in FIG. 13a showing another embodiment of the invention in which a quadrupole excitation is provided by four segments 1401a–1401d of a transmitter Alternatively, the quadrupole signal could be provided by pairing adjacent segments of the eight-element transmitter discussed above. Hereafter, when references are made to four element transmitters and receivers, it is to be understood that these are intended to cover eight element transmitters and receivers as well. The signal, after propagating through the formation, is detected by a dipole receiver 1410 comprising receiver elements 1403a and 1403c. Subsequently, a quadrupole mode is excited as in FIG. 13b by the transmitter 1400 and received by the same receiver elements 1403a and 1403c. Denoting by A and C the signals received by the receiver elements 1403a and 1403b for the transmitter firing of FIG. 13a, and by A* and C* the signals received by the receiver elements 1403a and 1403b in FIG. 13b, by performing the operation $$S=(A+C)-(A^*+C^*),$$

the signal S will be a quadrupole signal with all common modes including the BHA/drillbit signals attenuated. These common modes include the body wave through the tool, monopole signals (P and S) through the formation and Stoneley waves within the borehole. The Stoneley waves are more of a problem with an MWD tool than with a wireline tool due to the smaller annulus between the tool and the borehole wall; consequently, removal of the common modes is more important than for wireline logging.

Figure 14:
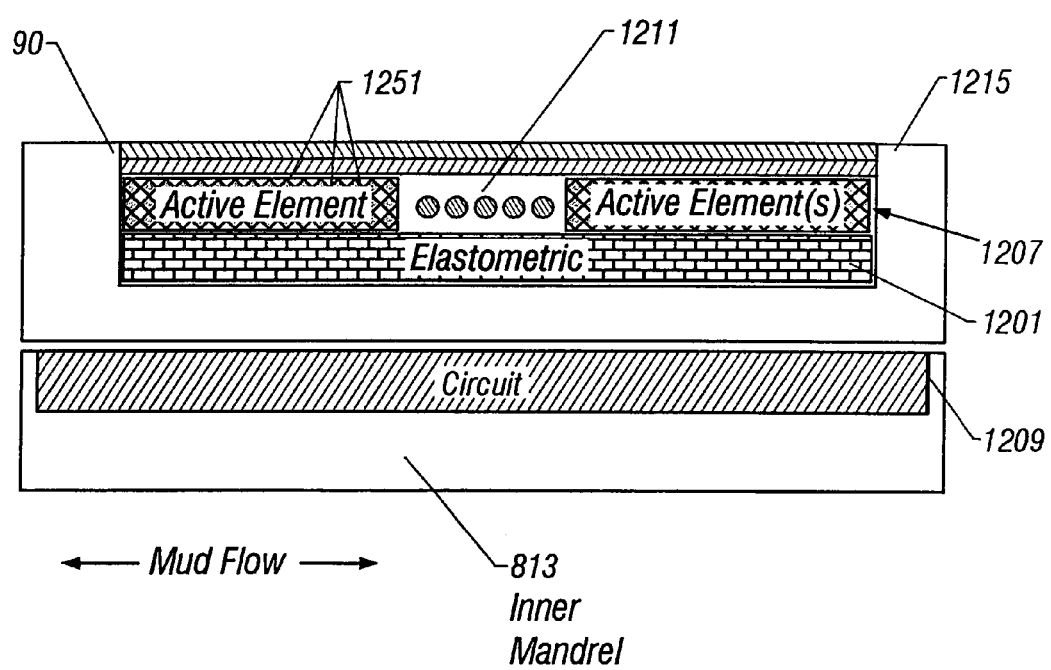
FIG. 14 illustrates a side view of a portion of the device of FIG. 12.

FIG. 14 shows a side view of a receiving sensor segment. The collar 90 contains a transducer element 1211 that includes a plurality of active elements 1251. The other components in FIG. 14 are as in FIG. 12 and are not discussed further.

The signals received from, for example, the FIG. 10 sensors A, B, C, and D may be combined as (A+C)–(B+D). For the source configuration and firing scheme shown in FIG. 7, the generated quadrupole wave arriving at the sensors A, B, C, and D can be described as follows. Sensors A and C will see, respectively, a pressure wave of the same polarity and amplitude, and sensors B and D, a pressure wave of the same amplitude but reversed polarity. Therefore, adding the signals from A and C and subtracting the signals from B and D, as (A+C)–(B+D), will produce a signal four times stronger than each individual signal of one sensor. Moreover, a LWD quadrupole source, when placed off the borehole axis, as is often the case during drilling, will also generate a monopole component to propagate along the borehole. At low frequencies, the monopole wave will propagate as a tube wave to contaminate the formation quadrupole shear wave. The low frequency tube wave motion is substantially homogeneous inside the borehole, such that each individual sensor will measure substantially the same tube wave signal. This monopole tube wave can be canceled out by the combination (A+C)–(B+D).

An alternative embodiment of the invention is the lowpass filtering of the signals recorded by each sensor below the cut-off frequency of the collar quadrupole wave. If the source pulses have high frequencies and are not modulated, or if the quadrupole component of the drilling noise has frequency content above the cut-off frequency of the collar quadrupole wave, then the collar quadrupole wave will be excited and recorded by the sensors. Because the collar quadrupole wave exists only above its cut-off frequency, it can be removed by low-pass filtering the sensor signals below the cut-off frequency. As stated above, this cut-off frequency can be determined from the borehole and drilling collar dimensions. Thus the low-pass filter can be designed and installed as a part of the sensor data acquisition and processing system.

For signal coherence enhancement and processing purposes, arrays of the above-mentioned detectors/receivers are placed longitudinally along the drilling collar. The spacing between the adjacent detectors typically ranges from 0.5 to 1 ft (0.1524 to 0.3048 m). The formation shear wave velocity may be determined by correlating the quadrupole shear wave across the receiver array using any standard array processing method as taught in U.S. Pat. No. 5,441,890 to Tang.

Figure 15A:
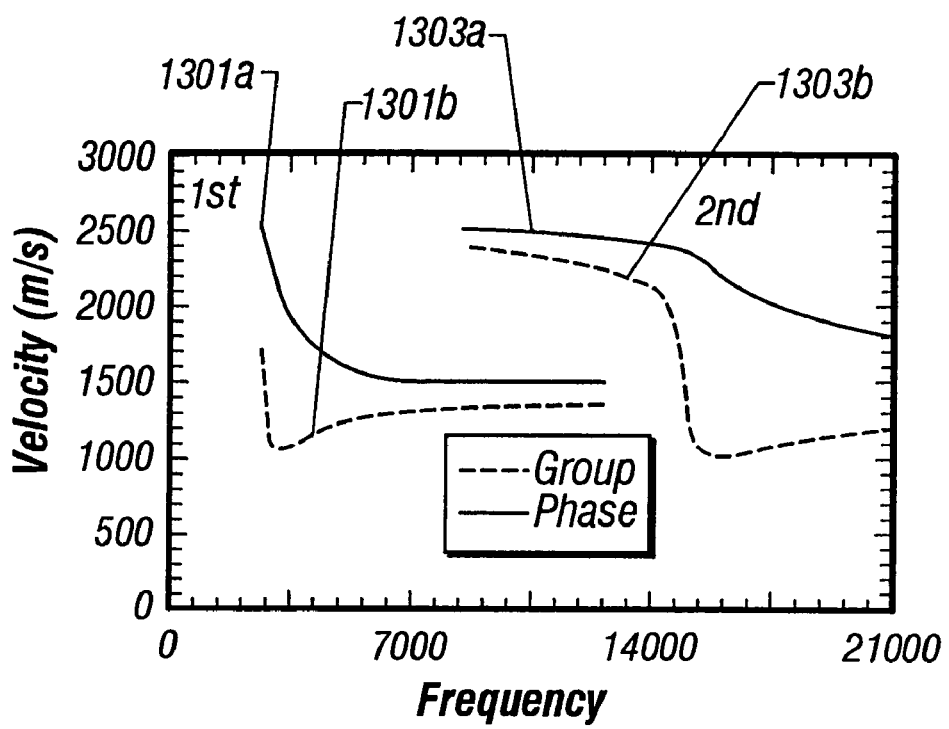
FIG. 15 shows the higher order quadrupole modes in a fast formation.
Figure 15B:
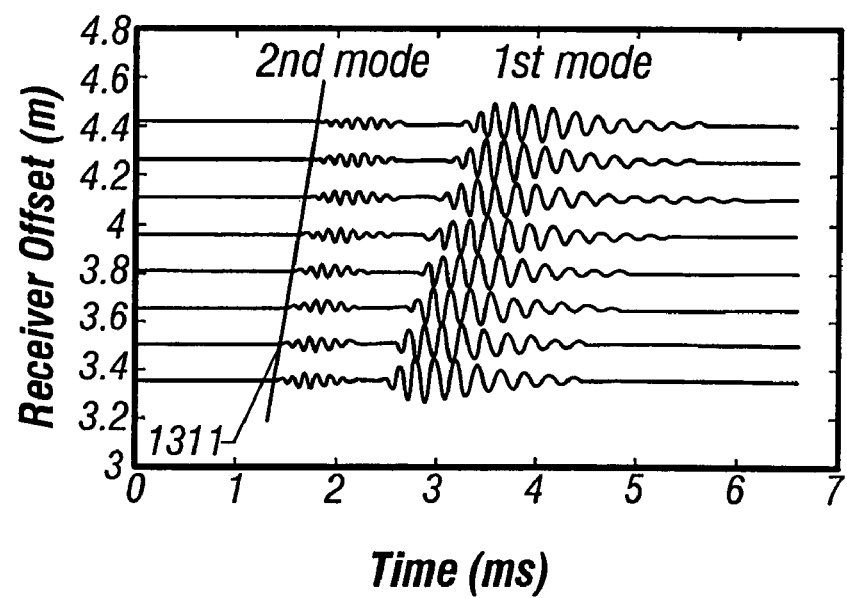

The above discussion has been directed towards determination of formation shear velocities by what would be recognized by those versed in the art as the first order mode. In "fast" formations where the shear velocity exceeds the compressional velocity in the borehole fluid, higher modes may exist. This is illustrated in FIG. 15a. The abscissa is-the frequency and the ordinate is the velocity. 1301a and 1301b show an example of the phase and group velocities of the $1^{st}$ order quadrupole mode while 1303a and 1303b show the phase and group velocities of the $2^{nd}$ order mode. The formation shear- and compressional-wave velocities are 4,500 and 2,500 m/s, respectively; the drilling collar and borehole dimensions and other related parameters are the same as in FIG. 5B. The waveform simulation uses a 5-kHz center-frequency source. Two quadrupole modes exist in the frequency range below 21 kHz. They are named the first and the second quadrupole mode, respectively, with the higher order mode existing in a higher frequency range. For the example in FIG. 15A, the first and the second mode starts to appear from about 3 and 8 kHz, respectively. The first mode shows a steeply decreasing phase dispersion curve 1301a with a well-defined group velocity 1301b minimum. The presence of the group velocity minimum produces a phenomenon called the Airy phase. The associated waveforms are shown in FIG. 15B. The wave energy associated with the Airy phase dominates the waveforms and lags significantly behind the formation shear-arrival time 1311, as shown in FIG. 15B. In this situation, it is difficult, if not impossible, to measure the fast formation shear-wave velocity from the waveform data for the first mode.

Measuring the waveform of the second quadrupole wave mode can directly determine the fast formation shear velocity. As shown in FIG. 15A, in a broad frequency range above the cut-off frequency, the phase velocity curve of the second mode is very close to the formation shear velocity (2,500 m/s in this case). Both the phase and group velocity curves of the second mode are quite flat, indicating minimal dispersion effects. In fact, the quadrupole wave excited in this higher frequency range, which is associated with the second mode, propagates at the formation shear-wave velocity, as illustrated in FIG. 15B. Since the second quadrupole mode of the formation can be effectively excited below the frequency range of the collar quadrupole, the interference from the latter mode can still be avoided or minimized. As shown in FIG. 15B, there is no discernable wave energy associated with the collar quadrupole. The example shown in FIGS. 15A, 15B shows that one can reliably determine the formation shear-wave velocity by exciting and measuring the second quadrupole wave mode associated with a fast formation.

The above examples have used a unitary drill collar to illustrate the principles of using quadrupole mode excitation for determination of formation shear properties in a LWD environment. For practical reasons, the logging tool of the present invention may comprise multiple segments of drill collars with transmitters and receivers on different segments of the drill collar. The principles described above are equally applicable to such segmented drill collars and are intended to be within the scope of the invention. It is possible that the cut-off frequency and the dispersion curves may be different for each segment of the drill collar. This does not affect the principles of operation of the logging tool.

Figure 16:
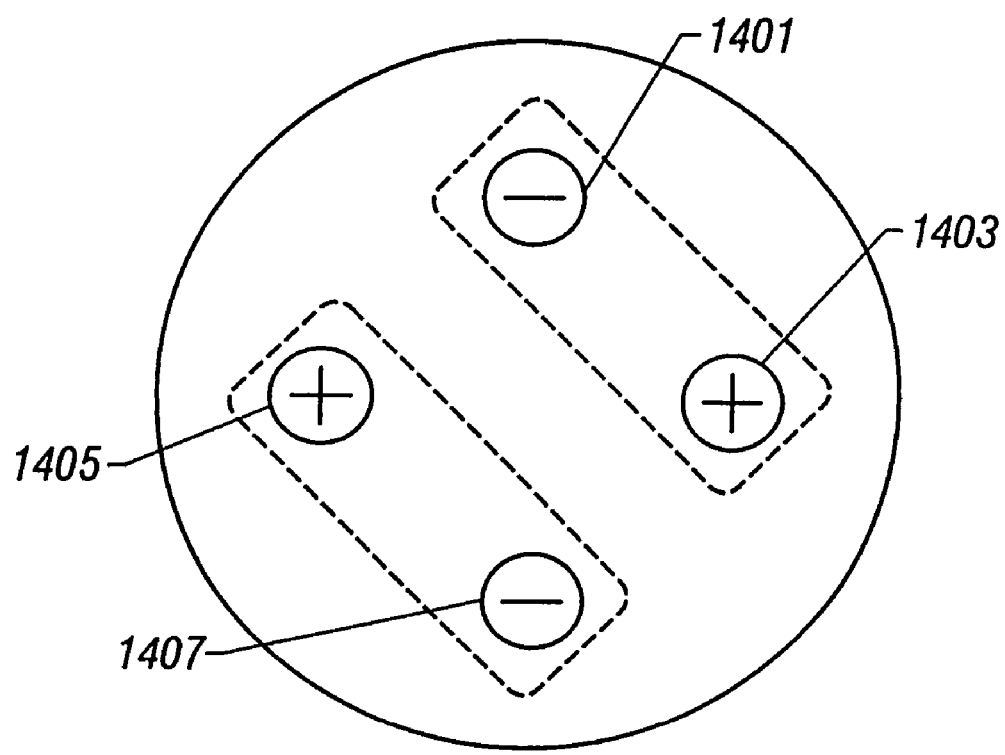
FIG. 16 shows the equivalence of a quadrupole to a pair of dipoles.

The above examples have further illustrated the implementation of quadrupoles by at least two pairs of matched "monopole" elements wherein elements within each pair move in unison. An alternative method for excitation of a quadrupole signal or reception of a quadrupole signal is possible using two dipoles, such as bender bars. This is illustrated in FIG. 16. The elements 1401–1403 comprise one dipole, e.g., a first bender bar, and the elements 1405–1407 comprise a second dipole, e.g., a second bendor bar. The motion of the bender bars is not radial: it is orthogonal to a radial line joining the center of the tool to the midpoint of the bender bar; nevertheless, a significant quadrupole signal may be excited or received by the configuration shown in FIG. 16. Such an implementation is intended to be within the scope of the present application.

The above description has been made with respect to a LWD application of the invention. The present invention may also be used in Logging-while-Tripping. As would be known to those versed in the art, it is common for drillbits to wear out and the process of removing a drillstring for the purpose of changing a drill bit is called "tripping." Making measurements while tripping has the additional advantage that no drilling is being carried out, so that the signals received by the receivers of the present logging tool are not contaminated by drillbit generated noise.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An acoustic logging apparatus comprising:
   (a) a drill collar conveyed on a drilling tubular in a borehole within a formation, said drill collar having a cutoff frequency for a collar mode wave therein;
   (b) an acoustic transmitter on the collar producing a signal, said signal comprising a formation mode and a collar mode;
   (c) at least one signal detector on the drill collar for detecting said signal, said at least one signal detector spaced apart from the transmitter in an axial direction of the collar and receiving signals including the formation mode and the collar mode; and
   (d) a processor including a filter for low-pass filtering of a component of the received signals having a frequency below the cutoff frequency.

2. The logging apparatus of claim 1 wherein said collar mode is a quadrupole mode and said transmitter is a quadrupole transmitter.

3. The logging apparatus of claim 1 wherein the at least one signal detector further comprises a plurality of detector elements disposed circumferentially about the collar.

4. The logging apparatus of claim 3 wherein the transmitter further comprises a plurality of transmitter elements.

5. The logging apparatus of claim 2 wherein said quadrupole transmitter further comprises at least 2N pairs of diametrically opposed transmitter elements disposed circumferentially around said collar, where N is an integer.

6. The logging apparatus of claim 4 wherein said transmitter elements further comprise a material selected from: (i) a piezoelectric material, (ii) an electrostrictive material; and, (iii) a magnetostrictive material.

7. The logging apparatus of claim 4 wherein said transmitter elements further comprise a device selected from (i) a bender bar, (ii) an electromechanical device, and, (iii) a porthole.

8. The logging apparatus of claim 1 wherein the at least one detector further comprises a plurality of detector elements comprising a material selected from: (i) a piezoelectric material, (ii) an electrostrictive material; and, (iii) a magnetostrictive material.

9. The logging apparatus of claim 1 wherein said formation has a shear velocity greater than a compressional velocity of a fluid in the borehole and said signal further comprises a first quadrupole mode and a second quadrupole mode, and said processor further comprises a filter for high pass filtering said signal above an Airy phase associated with the first quadrupole mode.

10. A shear wave logging apparatus comprising:
   (a) a drilling collar conveyed on a drilling tubular in a borehole within a formation, said drilling collar having a cutoff frequency for a collar mode wave therein;
   (b) a quadrupole transmitter on the collar producing a signal, said signal comprising a formation mode and a collar mode;
   (c) at least one detector spaced axially apart from the quadrupole transmitter for detecting said signal;
   (d) a processor for processing the detected signal using a filter for low pass filtering components of the signal below said cutoff frequency and determining therefrom a shear velocity of the formation.

11. A method of using an acoustic logging apparatus on drilling collar conveyed on a drilling tubular in a borehole within a formation, the method comprising:
   (a) using an acoustic transmitter on the logging apparatus for producing a quadrupole signal comprising a formation mode and a tool mode;
   (b) using at least one signal detector on the drilling collar spaced apart axially from the transmitter for detecting said signal; and
   (d) using a processor for low-pass filtering a component of the detected signal having a frequency below a cutoff frequency of the tool mode in the drill collar.

12. The method of claim 11 wherein said transmitter is comprises two pairs of diametrically opposed transmitter elements and producing said signal further comprises:
   activating said elements to produce a signal having a cos 2θ azimuthal variation.

13. The method of claim 11 wherein said transmitter further comprises two dipoles.

14. The method of claim 11 wherein the at least one signal detector further comprises detector elements disposed circumferentially on the collar.

15. The method of claim 11 wherein said at least one signal detector further comprises a plurality of axially spaced-apart signal detectors.

16. The method of claim 11 wherein the at least one transmitter comprises a quadrupole transmitter and the at least one signal detector comprises two detector elements, the method further comprising operating the transmitter at a first time with one polarization and at a second time with a second polarization.

17. The method of claim 15 wherein processing said signal further comprises using said plurality of axially spaced-apart detectors for beam steering.

18. The method of claim 11 wherein said formation has a shear velocity greater than a compressional velocity of a fluid in the borehole and said signal further comprises a first quadrupole mode and a second quadrupole mode, the method further comprising using said processor for high pass filtering said signal above an Airy phase associated with the first quadrupole mode.

19. A method of determining a parameter of interest of an earth formation using a shear wave logging apparatus on a drilling collar, the method comprising:
(a) using a quadrupole transmitter on the collar for producing a signal, said signal comprising a formation mode and a tool mode;
(c) using at least one detector spaced axially apart from the quadrupole transmitter for detecting said signal;
(d) using a processor for processing the detected signal using a filter for attenuating components of the signal above said cutoff frequency and determining therefrom a shear velocity of the formation.

* * * * *